United States Patent
Hill

(10) Patent No.: US 7,405,832 B2
(45) Date of Patent: Jul. 29, 2008

(54) APPARATUS AND METHODS FOR REDUCTION AND COMPENSATION OF EFFECTS OF VIBRATIONS AND OF ENVIRONMENTAL EFFECTS IN WAVEFRONT INTERFEROMETRY

(75) Inventor: Henry A. Hill, Tucson, AZ (US)

(73) Assignee: Zetetic Institute, Tucson, AZ (US)

(*) Notice: Subject to any disclaimer, the term of this patent is extended or adjusted under 35 U.S.C. 154(b) by 177 days.

(21) Appl. No.: 11/463,036

(22) Filed: Aug. 8, 2006

(65) Prior Publication Data
US 2007/0058174 A1     Mar. 15, 2007

Related U.S. Application Data

(60) Provisional application No. 60/706,268, filed on Aug. 8, 2005.

(51) Int. Cl.
*G01B 9/02* (2006.01)
(52) U.S. Cl. ........................................... 356/512
(58) Field of Classification Search ................. 356/489, 356/495, 511–516
See application file for complete search history.

(56) References Cited

U.S. PATENT DOCUMENTS

| | | | |
|---|---|---|---|
| 4,264,569 A | 4/1981 | Sinha | |
| 4,575,248 A | 3/1986 | Horwitz | |
| 5,155,363 A | 10/1992 | Steinbichler | |
| 5,392,116 A | 2/1995 | Makosch | |
| 5,412,474 A | 5/1995 | Reasenberg | |
| 5,589,938 A | 12/1996 | Deck | |
| 5,663,793 A | 9/1997 | DeGroot | |
| 5,760,901 A | 6/1998 | Hill | |
| 5,777,741 A | 7/1998 | Deck | |
| 5,883,717 A | 3/1999 | Dimarzio | |
| 5,915,048 A | 6/1999 | Hill et al. | |
| 6,271,923 B1 | 8/2001 | Hill | |
| 6,304,303 B1 | 10/2001 | Yamanaka | |
| 6,304,330 B1 | 10/2001 | Millerd | |
| 6,445,453 B1 | 9/2002 | Hill | |
| 6,480,285 B1 | 11/2002 | Hill | |
| 6,552,804 B2 | 4/2003 | Hill | |
| 6,847,452 B2 | 1/2005 | Hill | |
| 6,940,602 B2 | 9/2005 | Dubois et al. | |
| 2004/0227951 A1 | 11/2004 | Hill | |

(Continued)

OTHER PUBLICATIONS

D'Ariano et al. "Lower Bounds On Phase Sensitivity In Ideal And Feasible Measurements," *Phys. Rev A*49, pp. 3022-3036 (1994).

(Continued)

*Primary Examiner*—Hwa S Lee (Andrew)
(74) *Attorney, Agent, or Firm*—Wilmer Cutler Pickering Hale and Dorr LLP

(57) ABSTRACT

A wavefront interferometry system including: a wavefront interferometer that during operation combines a reference beam from a reference object and a measurement beam from a measurement object to generate a combined beam; and a processor system programmed to processes the combined beam to concurrently generate therefrom a control signal and information about the difference in wavefront profiles of the reference and measurement objects, wherein the control signal controls a system parameter so as to maintain an optical path length difference between a spot on the reference object and a corresponding spot on the measurement object at a constant value mod $2\pi$.

22 Claims, 7 Drawing Sheets

U.S. PATENT DOCUMENTS

| | | | |
|---|---|---|---|
| 2004/0246486 | A1 | 12/2004 | Hill |
| 2004/0257577 | A1 | 12/2004 | Hill |
| 2005/0046864 | A1 | 3/2005 | Millerd et al. |
| 2005/0195500 | A1 | 9/2005 | Hill |
| 2006/0033924 | A1 | 2/2006 | Hill |
| 2007/0014319 | A1 | 1/2007 | Hill |
| 2007/0177156 | A1* | 8/2007 | Mansfield .................. 356/512 |

OTHER PUBLICATIONS deGroot, P. "Vibration in phase-shifting interferometry," *J. Opt. Soc. Am. A* 12 pp. 354-365 (1995).

Hariharan, P. et al. "Digital phase-shifting interferometry: a simple error-compensating phase calculation algorithm" *Appl. Opt* 26 pp. 2504-2506 (1987).

International Search Report, International Application No. PCT/US06/31066, mailed Nov. 19, 2007 (2 pgs).

Schwider et al. "Digital wave-front measuring interferometry: some systematic error sources" *Appl. Opt.* 22, pp. 3421-3432 (1983).

Zanoni, C. "Differential Interferometer Arrangements For Distane And Angle Measurements: Principles, Advantages and Applications" *VDI Berichte* NR. 749, pp. 93-106 (1989).

* cited by examiner

APPARATUS AND METHODS FOR REDUCTION AND COMPENSATION OF EFFECTS OF VIBRATIONS AND OF ENVIRONMENTAL EFFECTS IN WAVEFRONT INTERFEROMETRY

This application claims the benefit of U.S. Provisional Application No. 60/706,268, filed Aug. 8, 2005, which is incorporated herein by reference.

TECHNICAL FIELD

This invention relates generally to wavefront interferometry and in particular to methods and apparatus for obtaining high precision information about imaged surfaces with reduced effects of vibrations and environmental changes. The methods and apparatus may be implemented in metrology systems that measure various parameters of a test object by generating simultaneously high precision information about a surface of the measurement object and information about the relative location, orientation, and/or deformation of a measurement object. The surface may correspond to the top surface of the measurement object or to a subsurface section of the measurement object.

RELATED PATENTS AND PATENT APPLICATIONS

U.S. Ser. No. 10/765,368, filed Jan. 27, 2004, entitled "Apparatus and Method for Joint Measurements of Conjugated Quadratures of Fields of Reflected/Scattered Beams by an Object in Interferometry" (ZI-47); U.S. Ser. No. 10/816, 180, filed Apr. 1, 2004, entitled "Apparatus and Method for Joint Measurement of Fields of Scattered/Reflected or Transmitted Orthogonally Polarized Beams by an Object in Interferometry" (ZI-50); U.S. Ser. No. 10/938,408, filed Sep. 10, 2004, entitled "Catoptric and Catadioptric Imaging Systems with Adaptive Catoptric Surfaces" (ZI-54); U.S. Ser. No. 11/204,758, filed Aug. 16, 2005, entitled "Apparatus and Method for Joint and Time Delayed Measurements of Components of Conjugated Quadratures of Fields of Reflected/ Scattered Beams by an Object in Interferometry" (ZI-57); U.S. Ser. No. 11/457,025, filed Jul. 12, 2006, entitled "Continuously Tunable External Cavity Diode Laser Sources with High Tuning Rates and Extended Tuning Ranges" (ZI-72); and U.S. Ser. No. 60/805,104, filed Jun. 19, 2006, entitled "Continuously Tunable External Cavity Diode Laser Sources with High Tuning and Switching Rates and Extended Tuning Ranges" (ZI-78), all of which are incorporated herein by reference.

BACKGROUND OF THE INVENTION

Phase-shift interferometry is an established method for measuring a variety of physical parameters ranging from intrinsic properties of gases to the displacement of objects such as described in a review article by J. Schwider entitled "Advanced Evaluation Techniques In Interferometry," *Progress In Optics* XXVII, Ed. E. Wolf (Elsevier Science Publishers 1990). The contents of the Schwider article are herein incorporated in their entirety by reference. Interferometric wavefront sensors can employ phase-shift interferometers (PSI) to measure the spatial distribution of a relative phase across an area or two-dimensional section, i.e., to measure a physical parameter across a two-dimensional section.

An interferometric wavefront sensor employing a PSI typically consists of a spatially coherent light source that is split into two beams, a reference beam and a measurement beam, which are later recombined after traveling respective optical paths of different lengths. The relative phase difference between the wavefronts of the two beams is manifested in a two-dimensional intensity pattern or interference signal known as an interferogram. PSIs typically have an element in the path of the reference beam which introduces three or more known phase-shifts. By detecting the intensity pattern with a detector for each of the phase-shifts, the relative phase difference distribution of the reference and measurement beam wavefronts can be quantitatively determined independent of any attenuation in either of the reference or measurement beams.

Phase shifting in homodyne detection methods using phase shifting methods such as piezo-electric driven mirrors have been widely used to obtain high-quality measurements under otherwise static conditions. The measurement of transient or high-speed events have required in prior art either ultra high speed phase shifting, i.e., much faster than the event time scales and corresponding detector read out speeds, or phase shifting apparatus and methods that can be used to acquire the required information by essentially instantaneous measurements.

Several methods of spatial phase shifting have been disclosed in the prior art. In 1983 Smythe and Moore described a spatial phase-shifting method in which a series of conventional beam-splitters and polarization optics are used to produce three or four phase-shifted images onto as many cameras for simultaneous detection. A number of US patents such as U.S. Pat. No. 4,575,248, U.S. Pat. No. 5,589,938, U.S. Pat. No. 5,663,793, U.S. Pat. No. 5,777,741, and U.S. Pat. No. 5,883,717 disclose variations of the Smythe and Moore method where multiple cameras are used to detect multiple interferograms. One of the disadvantages of these methods is that multiple cameras are required or a single camera recording multiple images and complicated optical arrangements are required to produce the phase-shifted images. The disadvantages of using multiple cameras or a camera recording multiple images are described for example in the commonly owned U.S. patent application Ser. No. 10/765,368 (ZI-47) entitled "Apparatus and Method for Joint Measurements of Conjugated Quadratures of Fields of Reflected/Scattered and Transmitted Beams by an Object in Interferometry" by Henry A. Hill. The contents of U.S. patent application Ser. No. 10/765,368 are herein incorporated in their entirety by reference.

An alternative technique for the generation of four simultaneous phase-shifted images for a homodyne detection method has also been disclosed by J. E. Millerd and N. J. Brock in U.S. Pat. No. 6,304,330 B1 entitled "Methods And Apparatus For Splitting, Imaging, And Measuring Wavefronts In Interferometry." The technique disclosed in U.S. Pat. No. 6,304,330 B1 uses holographic techniques for the splitting of a beam into four beams. The four beams are detected by a single pixelated detector. One consequence of the use of a single pixelated detector to record four phase-shifted images simultaneously is a reduction in frame rate for the detector by a factor of approximately four compared to a PSI recording a single phase-shifted image on a single pixelated detector with the same image resolution. It is further observed that since the generation of the multiple beams in the technique described in U.S. Pat. No. 6,304,303 B1 is performed on a non-mixed beam of an interferometer, the alternative technique of U.S. Pat. No. 6,304,303 B1 is most readily applicable to for example a Twyman-Green type interferometer.

Another alternative technique for generating the equivalent of multiple simultaneous phase shifted images has also been accomplished by using a tilted reference wave to induce a spatial carrier frequency to a pattern in an interferogram, an example of which is disclosed by H. Steinbichler and J. Gutjahr in U.S. Pat. No. 5,155,363 entitled "Method For Direct Phase Measurement Of Radiation, Particularly Light Radiation, And Apparatus For Performing The Method." This another alternative technique for generating the equivalent of multiple simultaneous phase shifted images requires the relative phase of the reference and measurement field to vary slowly with respect to the detector pixel spacing.

The another alternative technique for generating the equivalent of multiple simultaneous phase shifted images using a tilted reference wave is also used in an acquisition technology product FlashPhase™ of Zygo Corporation. The steps performed in FlashPhase™ are first acquire a single frame of intensity or interferogram, next generate a two-dimensional complex spatial frequency map by a two-dimensional finite Fourier transform (FFT), next generate a filter and use the filter to isolate a first order signal, then invert the filtered spatial frequency map by an inverse two-dimensional FFT to a phase map or wavefront map. Although the acquisition technology product FlashPhase™ is computationally complex, it is very fast on today's powerful computers.

Other methods of generating simultaneous multiple phase-shifted images include the use of gratings to introduce a relative phase shift between the incident and diffracted beams, an example of which is disclosed in U.S. Pat. No. 4,624,569. However, one of the disadvantages of these grating methods is that careful adjustment of the position of the grating is required to control the phase shift between the beams.

Yet another method for measuring the relative phase between two beams is disclosed in U.S. Pat. No. 5,392,116 in which a linear grating and five detector elements are used. However, this method only measures the difference in height of two adjacent spots on a measurement object and not the simultaneous measurement of a two-dimensional array of spots on the measurement object. The method also generates a set of multiple beams as a mixed beam of an interferometer and therefore has a similar limitation to the technique described in U.S. Pat. No. 6,304,303 B1 wherein the alternative technique of U.S. Pat. No. 6,304,303 B1 is most readily applicable to for example a Twyman-Green type interferometer.

A disadvantage of the techniques for generating simultaneous multiple phase shifted images described in U.S. Pat. No. 6,304,303 B1 is a first order sensitivity to variations in the relative sensitivities of conjugate sets of detector pixels and to variations in corresponding properties of the optical system used to generate the four phase shifted images wherein a conjugate set of pixels is four.

It is noted that wavefront sensing can be accomplished by non-interferometric means, such as with Hartmann-Shack sensors which measure the spatially dependent angle of propagation across a wavefront. These types of sensors are disadvantageous in that they typically have much less sensitivity and spatial resolution than interferometric wavefront sensors.

Variable frequency and multiple frequency sources have been used to measure and monitor the relative path length difference such as described in U.S. Pat. No. 5,412,474 entitled "System For Measuring Distance Between Two Points Using A Variable Frequency Coherent Source" by R. D. Reasenberg, D. Phillips, and M. C. Noecker and in references contained therein. The contents of U.S. Pat. No. 5,412, 474 are herein incorporated in their entirety by reference. The variable frequency source techniques have further been used to remove phase redundancy in making absolute distance measurements.

Prior art also teaches the practice of interferometric metrology using heterodyne techniques and a detector having a single detector element or having a relatively small number of detector elements. Prior art further teaches the practice of interferometric metrology using a step and stare method with a single-homodyne detection method for the acquisition of conjugated quadratures of fields of reflected and/or scattered beams when a detector is used that comprises a large number of detector elements. The term single-homodyne method is used hereinafter for homodyne detection methods wherein the reference and measurement beams each comprise one component corresponding to a component of a conjugated quadratures. The respective conjugated quadrature of a field is $|a|\sin\phi$ when the quadrature $x(\phi)$ of the field is expressed as $|a|\cos\phi$.

The step and stare method and single-homodyne detection method are used in prior art in order to obtain for each detector element a set of at least three electrical interference signal values with a substrate that is stationary with respect to the respective interferometric metrology system during the stare portion of the step and stare method. The set of at least three electrical interference signal values are required to obtain for each detector element conjugated quadratures of fields of a measurement beam comprising a reflected and/or scattered field from a spot in or on a substrate that is conjugate to the each detector element.

Commonly owned prior art teaches the practice of acquisition of the respective at least three electrical interference signal values in interferometric metrology when operating in a relatively fast scanning mode wherein each of the at least three electrical interference signal values corresponds to the same respective spot on or in a substrate and contain information that can be used for determination of joint measurements of conjugated quadratures of fields in both spatial and temporal coordinates.

As will be appreciated from the description presented below, various embodiments of the invention described herein involve scanning and non-scanning interferometric metrology using a single- and multiple-homodyne detection methods to obtain non-joint and joint measurements, respectively, of conjugated quadratures of fields either reflected and/or scattered or transmitted by a substrate with a detector having a large number of detector elements, that exhibits an intrinsic reduced sensitivity to effects of vibrations and environmental changes, and that enables compensation of effects of vibrations and of environmental changes. The classification of multiple-homodyne detection methods is used hereinafter for homodyne detection methods wherein the reference and measurement beams each contain information about two components of each of one or more conjugated quadratures. For each spot in and/or on the substrate that is imaged a corresponding set of at least three electrical interference signal values is obtained. Each of the set of at least three electrical interference signal values contains information for determination of either a non-joint or a joint measurement of respective conjugated quadratures of fields and in addition contains information for the enablement of a procedure for the compensation of effects of vibrations and of environmental changes in the phases corresponding to conjugated quadratures as cyclic errors.

Prior art teaches a homodyne detection method, referenced herein as a double homodyne detection method, that is based on use of four detectors wherein each detector generates an electrical interference signal value used to furnish information about a corresponding component of a conjugated quadratures of a field such as described in cited U.S. Pat. No. 6,304,303 B1 and in Section IV of the article by G. M D'ariano and M G. A. Paris entitled "Lower Bounds On Phase Sensitivity In Ideal And Feasible Measurements," *Phys. Rev. A* 49, pp 3022-3036 (1994). The four detectors generate the four electrical interference signal values simultaneously and each electrical interference signal value contains information relevant to one conjugated quadratures component. Accordingly, the double homodyne detection method does not make joint determinations of conjugated quadratures of fields wherein each electrical interference value contains information simultaneously about each of two orthogonal components of the conjugated quadratures although the four electrical interference signal values are obtained jointly with respect to time.

Various multiple-homodyne detection methods described herein, e.g., the bi-homodyne and quad-homodyne detection methods, obtain measurements of the at least three electrical interference signal values wherein each measured value of an electrical interference signal contains simultaneously information about two orthogonal components of a conjugated quadratures. The faster rate for the determination of conjugated quadratures is achieved when using the quad-homodyne detection method relative to the bi-homodyne detection method to obtain the measured values of the electrical interference signal values in two measurements. The next fastest rate for the determination of conjugated quadratures is obtained when operating the bi-homodyne detection method configured for operation with a set of three phase shift values.

Compensation for effects of vibrations and environmental changes as described herein is implemented by two different procedures. In each of the two different procedures, advantage is taken of properties of various embodiments of the invention with respect to compensation for effects of vibrations and environmental changes as cyclic errors. In one procedure, the compensation for the effects of vibrations and environmental changes is based on information obtained when operating in the reference frame to reduce the effects of vibrations and environmental changes.

In the reference frame, the optical path length difference between a spot on the reference object and a corresponding spot on the measurement object is maintained a constant value mod $2\pi$ at the reference frequency. The reference frequency is controlled by using information from a portion of the reference and measurement beams or a portion of the information contained in the respective two-dimensional arrays of electrical interference signal values corresponding to the corresponding spots on the reference and measurement objects.

A description of the first procedure is given in the corresponding portion of the description of the first embodiment of the present invention. In the second procedure, a spatial frequency is introduced into the relative path length between the reference and measurement beam objects and the effect of the spatial frequency is used in the measurement of the cyclic errors in the phases of measured conjugated quadratures that represent the effects of vibration and environmental changes. The measured values of cyclic errors are used in a subsequent procedure to compensate for the effects of vibrations and environmental changes. The measured values of cyclic errors may also be used to monitor changes in position, angular orientation, and/or deformation of a measurement object corresponding to phase measurements mod $2\pi$. The monitored changes in position, angular orientation, and/or deformation corresponding to phase measurements mod $2\pi$ can be used as an error signal to a servo systems that control either the reference frequency and/or the relative positions, angular orientations, and/or deformations of the reference and measurement objects corresponding to phase measurements mod $2\pi$.

The error signal used to monitor changes in the relative position of the corresponding portions of the reference and measurement objects comprises two-dimensional spatial Fourier components of the phases of the conjugated quadratures of relative path length differences between the reference and measurement objects corresponding to the cyclic errors. The information about changes in the relative angular orientation of the reference and measurement objects is obtained by using linear displacement information about two different portions of the array of relative path length differences between the reference and measurement objects. The information about changes in relative deformations of the reference and measurement objects is obtained by using linear displacement information about three or more different portions of the array of relative path length differences between the reference and measurement objects.

The spatial frequency is introduced into the relative path length between the reference and measurement beam objects by introducing a tilt between the reference and measurement objects. The role of the tilt which may be used is different from the roles of the tilt used in the product FlashPhase™ and in published US Patent Application 20050046864 entitled "Simultaneous phase-shifting Fizeau interferometer" by J. E. Millerd and J. C. Wyant. In US Patent Application 20050046864, the tilt is used to make it possible to separate the reference and measurement beams after the reference and measurement objects, respectively, so that the reference and measurement beams can be optically processed separately before subsequently recombining the optically processed reference and measurement beams to form mixed output beams. In FlashPhase™, the tilt is used to introduce a spatial carrier frequency that enables the extraction of conjugated quadratures across a wavefront from a single array of measured electrical interference signal values. The tilt in both cases is not used to generate information about the effect of the vibrations and environmental changes.

In the second procedure described herein, the tilt is used to generate information about the effects of the vibrations and environmental changes that appear as cyclic errors for subsequent use in compensation for the effects of the vibrations and environmental changes including the effects of rotation and deformations.

With respect to information content and signal-to-noise ratios, the conjugated quadratures of fields obtained jointly in an interferometric metrology system that is operating in a scanning mode and using either the bi-homodyne or quad-homodyne detection methods are substantially equivalent to conjugated quadratures of fields obtained when operating the interferometric metrology system in a step and stare mode, i.e., a non-scanning mode. The conjugated quadratures of fields obtained jointly when operating in the scanning mode and using either the bi-homodyne or the quad-homodyne detection methods also have reduced sensitivity, i.e., only in second and higher order effects, to pinhole-to-pinhole variations in properties of a conjugate set of pinholes used in a confocal microscopy system and reduced sensitivity, i.e., only in second and higher order effects, to pixel-to-pixel variation of properties within a set of conjugate pixels of a multipixel detector in confocal and non-confocal microscopy systems.

The conjugated quadratures of fields obtained jointly when operating in the scanning mode and using either the bi-homodyne or the quad-homodyne detection method further have reduced sensitivity, i.e., only in second and higher order effects, to pulse to pulse variations of the input beam used in generating the conjugated quadratures of fields and can exhibit reduced sensitivity, i.e., only in second and higher order effects, to a relative motion of a substrate being imaged during the acquisition of joint measurements of the conjugated quadratures of fields. The reduced sensitivity is relative to conjugated quadratures of fields obtained when operating with a single-homodyne detection method in either a scanning or non-scanning mode. In microscopy applications, conjugated quadratures of fields are obtained for each spot in and/or on a substrate that is imaged.

The conjugated quadratures of fields that are obtained jointly in a non-dispersion and dispersion linear or angular displacement interferometer operating in a scanning mode and using either the bi-homodyne or the quad-homodyne detection methods have a reduced phase redundancy problem as compared to non-dispersion and dispersion linear or angular displacement interferometer operating in a scanning mode and using a single-homodyne detection method.

The signal-to-noise ratios obtained operating in the reference frame are generally greater than the signal-to-noise ratios obtained when not operating in the reference frame such as with the techniques for generating simultaneous multiple phase shifted images in the presence of vibrations and environmental changes.

SUMMARY OF THE INVENTION

Apparatus and methods are described for reduction and/or compensation of effects of vibrations and of environmental effects comprising translational, rotational, and deformational effects in optical path lengths in joint measurements of conjugated quadratures of fields of reflected and/or scattered and transmitted beams in wavefront interferometry. Wavefront interferometric metrology systems based for example on Fizeau and Twyman-Green interferometers are used to make measurements of phase shifts between corresponding portions of wavefronts of reference and measurement beams in a coordinate system where the optical path length difference between a spot on a reference object and a corresponding spot on a measurement object is maintained a constant value mod $2\pi$ at a reference optical frequency and the wavefront interferometric metrology system generates information about the difference in wavefront profiles of reference and measurement beams in the reference frame. A change of $2\pi$ in the phase coordinate of the reference frame corresponds to a change in frequency of an optical beam equal to the corresponding frequency spacing of longitudinal cavity modes for the cavity defined by the reference and measurement objects. The optical path length difference between the reference and measurement objects at the spots is maintained the constant value mod $2\pi$ either by adjusting the reference optical frequency mod the frequency spacing of the longitudinal cavity modes frequency spacing or by adjusting the associated physical path length difference of the cavity.

Interferometric metrology systems used for the wavefront interferometry are configured to function simultaneously as a linear displacement and/or angular displacement interferometers and an interferometer for measuring properties of a wavefront, i.e., a difference in surface profiles of reference and measurement objects. The information obtained about the relative linear and/or angular displacements and/or relative deformations of reference and measurement objects in the interferometric metrology systems is used to maintain the reference frame phase condition and/or compensate for effects of the vibrations and environmental changes in processing of information obtained on properties of the wavefronts.

Homodyne detection methods are used to obtain measurements of quantities subsequently used in determination of joint measurements of the conjugated quadratures of fields which exhibit an intrinsic reduced sensitivity to the effects of vibrations and environmental changes and enable procedures for compensation of effects of the vibrations and environmental changes in the processing of the measured quantities. The enablement of the compensation is a consequence of the appearance of the effects of the vibrations and environmental changes in the phases corresponding to conjugated quadratures as cyclic errors which can either easily be identified and measured or determined from other measured quantities.

In general, in one aspect the invention features a wavefront interferometry system including: a source for generating a source beam; a reference object which interacts with at least a portion of the source beam to produce a reference beam; an optical system for deriving a measurement beam from the source beam and directing the measurement beam towards a measurement object to produce a return measurement beam that is combined with the reference beam to produce a combined beam; a beam splitter for separating out first and second portions of the combined beam; a first detector system for generating a first interference signal from the first portion of the combined beam; a second detector system for generating a second interference signal from the second portion of the combined beam; and a processor system programmed to concurrently process both the first and second interference signals to generate from the first interference signal a control signal and from the second interference signal information about the difference in wavefront profiles of the reference and measurement objects, wherein the control signal controls a system parameter so as to maintain an optical path length difference between a spot on the reference object and a corresponding spot on the measurement object at a constant value mod $2\pi$.

Other embodiments include one or more of the following features. The first detector samples a part of the first portion of the combined beam that corresponds to the spot on the measurement object. The control signal controls the reference optical frequency of the source beam generated by the source so as to maintain the optical path length difference between a spot on the reference object and a corresponding spot on the measurement object at a constant value mod $2\pi$. The wavefront interferometer also includes a transducer that controls the physical position of the reference object and wherein the control signal controls the transducer so as to maintain the optical path length difference between a spot on the reference object and a corresponding spot on the measurement object at a constant value mod $2\pi$. The wavefront interferometer is configured to employ a multiple-homodyne detection technique to determine the information about the difference in wavefront profiles of the reference and measurement objects. The multiple-homodyne detection technique is either a bi-homodyne detection technique or a quad-homodyne detection technique. The wavefront interferometer is either a Fizeau interferometer or a Twyman-Green interferometer. The processor system is programmed to introduce a sequence of phase shifts between reference beam and the return measurement beam. The sequence of phase shifts is selected so as to eliminate from conjugated quadratures derived from the combined beam any first order effects due to unwanted vibrations and/or environmental changes. Effects of unwanted vibrations and/or environmental changes appear as cyclic errors in conjugated quadratures derived from the combined beam and the processor system is programmed to measure and compensate for those cyclic errors. The combined beam is an interference beam. The second detector system includes an array of detector elements which measures a corresponding array of locations on the measurement object.

In general, in another aspect, the invention features a wavefront interferometry system including: a wavefront interferometer that during operation combines a reference beam from a reference object and a measurement beam from a measurement object to generate a combined beam; and a processor system programmed to processes the combined beam to concurrently generate therefrom a control signal and information about the difference in wavefront profiles of the reference and measurement objects, wherein the control signal controls a system parameter so as to maintain an optical path length difference between a spot on the reference object and a corresponding spot on the measurement object at a constant value mod $2\pi$.

In general, in still another aspect the invention features a method involving: combining a reference beam from a reference object with a return measurement beam from a measurement object to generate a combined beam; processing the combined beam to concurrently generate therefrom a control signal and information about the difference in wavefront profiles of the reference and measurement objects; and using the control signal to maintain an optical path length difference between a spot on the reference object and a corresponding spot on the measurement object at a constant value mod $2\pi$.

Other embodiments include one or more of the following features. The method further involves: generating a source beam; interacting at least a portion of the source beam with the reference object to produce the reference beam; deriving the measurement beam from the source beam; and interacting the measurement beam with the measurement object to produce the return measurement beam. Processing the combined beam involves using a single-homodyne detection method to process one portion of the combined beam to generate the control signal. Processing the combined beam involves using a multiple-homodyne detection method to process one portion of the combined beam to generate said information about the difference in wavefront profiles of the reference and measurement objects. The method also involves introducing a sequence of phase shifts between reference beam and the return measurement beam. The sequence of phase shifts is selected so as to eliminate from conjugated quadratures derived from the combined beam any first order effects due to unwanted vibrations and/or environmental changes. The effects of unwanted vibrations and/or environmental changes appear as cyclic errors in conjugated quadratures derived from the combined beam and the method further involves measuring and compensating for those cyclic errors.

An advantage of certain embodiments of the present invention is the reduction of the effects of vibration and environmental changes by the operation in a reference frame wherein the optical path length between a spot on a reference object and a corresponding spot on a measurement object is maintained a constant value mod $2\pi$ at a reference frequency.

Another advantage of certain embodiments of the present invention is that it exhibits an intrinsic reduced sensitivity to the effects of vibrations and environmental changes.

Another advantage of certain embodiments of the present invention is that it enables procedures for compensation of effects of the vibrations and environmental changes that appear as cyclic errors.

Another advantage of certain embodiments of the present invention is the reduction of the effects of vibrations and environmental changes by the control of the physical path length difference between the corresponding spots on the reference and measurement objects.

Another advantage of certain embodiments of the present invention is that the signal-to-noise ratios obtained operating in the reference frame are generally greater than the signal-to-noise ratios obtained when not operating in the reference frame such as with prior art techniques for generating simultaneous multiple phase shifted images in the presence of vibrations and environmental changes.

Another advantage of certain embodiments of the present invention is that a one-, two- or three-dimensional image of a substrate may be obtained by an interferometric metrology system when operating in a scanning mode with a relatively fast scan rate. The image comprises a one-, a two-, or a three-dimensional array of conjugated quadratures of reflected and/or scattered or transmitted fields.

Another advantage of certain embodiments of the present invention is that information used in the determination of a conjugated quadratures of reflected and/or scattered or transmitted fields by a substrate is obtained jointly or effectively obtained jointly, i.e., simultaneously or at the same average times, respectively.

Another advantage of certain embodiments of the present invention is that the conjugated quadratures of fields that are obtained jointly or effectively obtained jointly when operating in the scanning mode and using either the bi-homodyne or quad-homodyne detection methods have reduced sensitivity, i.e., only in second and higher order effects, to effects of pinhole-to-pinhole variations in the properties of a conjugate set of pinholes used in a confocal microscopy system that are conjugate to a spot in or on the substrate being imaged at different times during the scan.

Another advantage of certain embodiments of the present invention is that the conjugated quadratures of fields that are obtained jointly or effectively obtained jointly when operating in the scanning mode and using either the bi-homodyne or the quad-homodyne detection methods have reduced sensitivity, i.e., only in second and higher order effects, to effects of pixel-to-pixel variation of properties within a set of conjugate pixels that are conjugate to a spot in or on the substrate being imaged at different times during the scan.

Another advantage of certain embodiments of the present invention is that the conjugated quadratures of fields that are obtained or effectively obtained jointly when operating in the scanning mode and using either the bi-homodyne or the quad-homodyne detection methods can have reduced sensitivity, i.e., only in second and higher order effects, to effects of pulse to pulse variations of a respective set of pulses or pulse sequences of an input beam to the interferometer system.

Another advantage of certain embodiments of the present invention is an increased throughput for an interferometric metrology system with respect to the number of spots in and/or on a substrate imaged per unit time.

Another advantage of certain embodiments of the present invention is reduced systematic errors in a one-, a two-, or a three-dimensional image of a substrate obtained in interferometric metrology systems.

Another advantage of certain embodiments of the present invention is reduced sensitivity, i.e., only in second and higher order effects, to an overlay error of a spot in or on the substrate that is being imaged and a conjugate image of a conjugate pixel of a multipixel detector during the acquisition of the respective electrical interference values for each spot in and/or on a substrate imaged using interferometric metrology systems. Overlay errors are errors in the set of four conjugate images of a respective set of conjugate detector pixels relative to the spot being imaged for either the bi-homodyne or quad-homodyne detection methods.

Another advantage of certain embodiments of the present invention is that the phase of an input beam component does not affect values of measured conjugated quadratures when operating in a frequency or temporal encoded mode of either the bi-homodyne or quad-homodyne detection methods.

Another advantage of certain embodiments of the present invention is the measurement of relative changes in position, orientation, and/or deformation between the reference and measurement objects based on phase measurements mod $2\pi$.

Another advantage of certain embodiments of the present invention is the compensation for the residual effects of vibration and environmental changes including the effects of rotation and deformation in measured arrays of conjugated quadratures.

Another advantage of certain embodiments of the present invention is the control of the relative positions, orientations, and/or deformations of the reference and measurement objects using the measurements of relative changes in positions, orientations, and/or deformations between the reference and measurement objects based on phase measurements mod $2\pi$.

The details of one or more embodiments of the invention are set forth in the accompanying drawings and the description below. Other features, objects, and advantages of the invention will be apparent from the description and drawings, and from the claims.

DETAILED DESCRIPTION

High speed, high resolution, and high precision imaging with high signal-to-noise ratios are required for example in inspection of masks and wafers in microlithography and surfaces of optical elements. One technique for obtaining high resolution imaging with high signal-to-noise ratios is an interferometric metrology system. However, the acquisition of high signal-to-noise ratios with the high resolution imaging generally limits data rates in part by the necessity to acquire conjugated quadratures of fields of a reflected and/or scattered or transmitted beam for each spot in and/on a substrate being imaged. The determination of conjugated quadratures requires the measurement of at least three electrical interference signal values for the each spots in and/or on the substrate being imaged (see Section 7 of the article by Schwider, ibid.). Acquisition of the at least three interference signal values for the each spots places tight restrictions on acceptable levels of vibration and environmental changes and on how large a rate of scan can be employed in generation of a one-, a two- or three-dimensional image of the substrate having artifacts down to of the order of 100 nm in size or smaller. Various embodiments described herein relax, in the case of multiple-homodyne detection methods, the tight restriction on levels of vibration and environmental changes as a consequence of a reduction of effects and compensation for effects of vibrations and environmental changes.

Figure 1A:
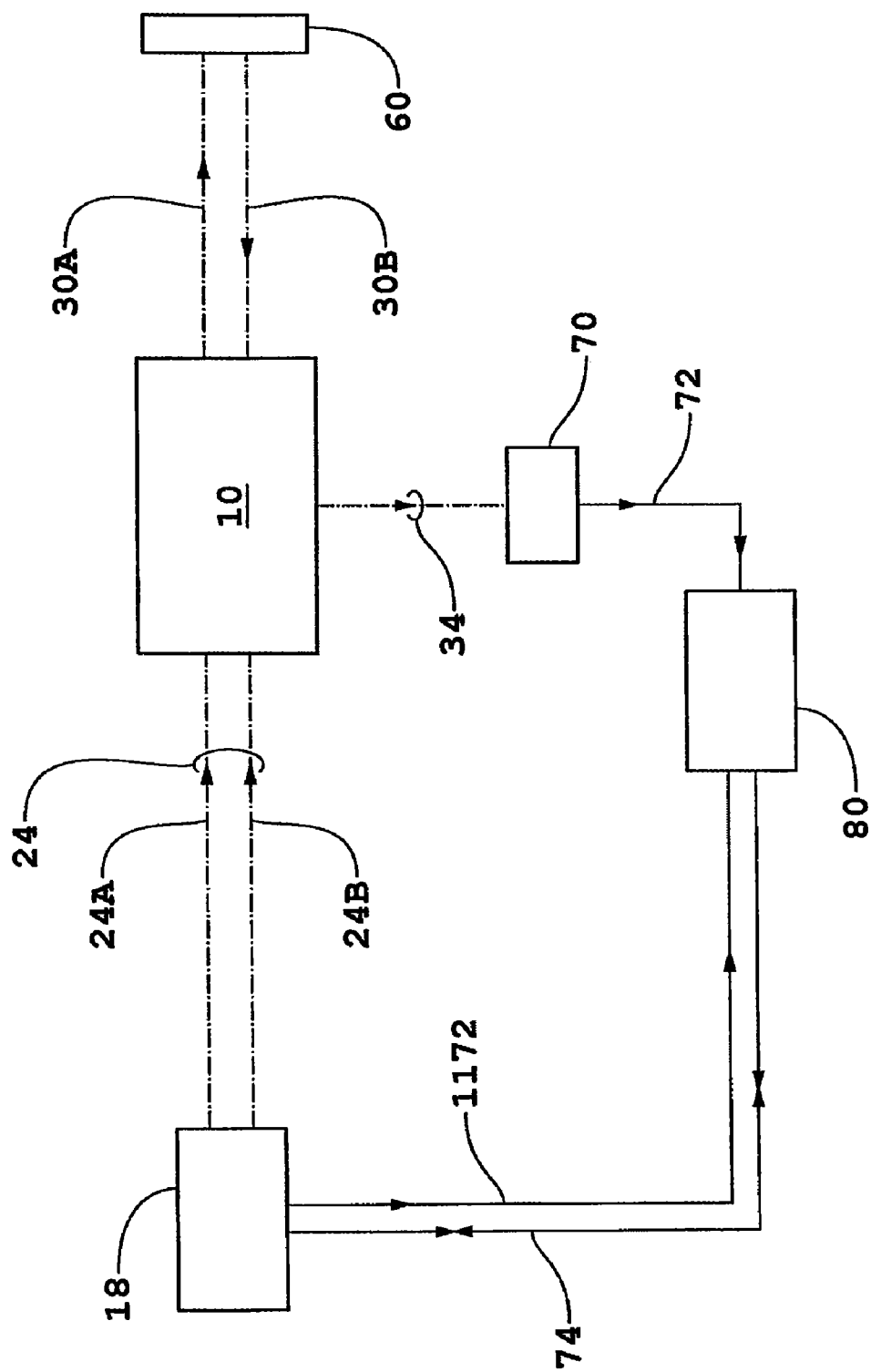
FIG. 1a is a diagram of an interferometric metrology system that uses homodyne detection methods.

A general description of various embodiments incorporating the present invention is first given for interferometric metrology systems wherein multiple-homodyne detection methods are used for making joint or substantially joint, and time-delayed measurements of components of conjugated quadratures of fields of beams reflected/scattered or transmitted/scattered by a measurement object. Referring to FIG. 1a, an interferometric metrology system is shown diagrammatically comprising an interferometer 10, a source 18, detector 70, an electronic processor and controller 80, and a measurement object or substrate 60. Source 18 generates beam 24 comprising one or more components that are encoded using frequency, polarization, temporal, or spatial encoding or some combination thereof.

Frequency encoding is described in referenced U.S. patent application Ser. No. 10/765,368 (ZI-47); polarization encoding is described in U.S. patent application Ser. No. 10/816,180 (ZI-50) entitled "Apparatus and Method for Joint Measurement of Fields of Scattered/Reflected Orthogonally Polarized Beams by an Object in Interferometry;" temporal encoding is described in U.S. patent application Ser. No. 11/204,758 (ZI-57) entitled "Apparatus and Method for Joint And Time Delayed Measurements of Components of Conjugated Quadratures of Fields of Reflected/Scattered and Transmitted/Scattered Beams by an Object in Interferometry;" and spatial encoding is described in U.S. patent application Ser. No. 10/938,408 (ZI-54) entitled "Catoptric and Catadioptric Imaging Systems With Adaptive Catoptric Surfaces." U.S. patent application Ser. Nos. 10/765,368; 10/816,180; 11/204,758; and 10/938,408 are incorporated herein by reference.

Input beam 24 is formed with components 24A and 24B wherein each comprises one or more encoded components. The relative orientation of polarizations of different components of beams 24A and 24B may be parallel or orthogonal or at some other angle according to the requirements of an end use application. The measurement beam components 24B of input beam 24 are coextensive in space and the corresponding reference beam components 24A are coextensive in space and have the same temporal window function as the temporal window function of the corresponding components of the measurement beam components although measurement beam components 24B and reference beam components 24A may be either spatially separated or spatially coextensive.

Measurement beam 30A incident on substrate 60 is generated either directly from beam 24B or in interferometer 10. Measurement beam 30B is a return measurement beam generated as a portion of measurement beam 30A reflected/scattered or transmitted/scattered by substrate 60. Return measurement beam 30B is combined with reference beam 24A in interferometer 10 to form output beam 34.

Output beam 34 is detected by detector 70 preferably by a quantum process to generate electrical interference signals for multiple-homodyne detection methods as signal 72.

Detector 70 may further comprise an analyzer to select common polarization states of the reference and return measurement beam components of beam 34 to form a mixed beam. Alternatively, interferometer 10 may comprise an analyzer to select common polarization states of the reference and return measurement beam components such that beam 34 is a mixed beam.

In the practice, known phase shifts are introduced between the encoded reference and measurement beam components of output beam 34 by one or more different techniques depending on the method of encoding used in a homodyne detection method. In one technique, phase shifts are introduced between certain of the corresponding encoded reference and measurement beam components of input beam 24 by source 18 as controlled by a component of signal 74 from electronic processor and controller 80. In another technique, phase shifts are introduced between certain other of the corresponding encoded reference and measurement beam components as a consequence of a non-zero optical path difference between the reference and measurement objects in interferometer 10 and corresponding frequency shifts introduced to the certain other encoded components of input beam components 24A and 24B by source 18 as controlled by a component of signal 74 from electronic processor and controller 80 such as described in a corresponding portion of the description of the first embodiment of the present invention. In yet another technique, phase shifts are introduced between other certain other of the corresponding encoded reference and measurement beam components as a consequence of relative translations of the reference and measurement objects as controlled by electronic processor and controller 80 such as described in a corresponding portion of the description of the first embodiment of the present invention.

There are different ways to configure source 18 to meet the input beam requirements of different embodiments of the present invention. For applications where interferometer 10 is an interferometer such as a Fizeau or a Twyman-Green type interferometer, a combination of frequency and temporal encoding can be used with or without use of phase shifting introduced by a relative translation of reference and measurement objects for multiple-homodyne detection methods.

Continuing with the description of different ways to configure source 18 to meet the input beam requirements of different embodiments of the present invention, source 18 may comprise a pulsed source and/or a shutter. There are a number of different ways for producing a pulsed source comprising one or more frequencies such as described in referenced U.S. patent application Ser. No. 11/204,758 (ZI-57). Source 18 may be configured using for example beam-splitters to generate an output beam comprising two or more encoded components to form a coextensive measurement beam and a coextensive reference beam that are either spatially separated beams for input beam 24 or form a coextensive beam for input beam 24 as required in various embodiments of the present invention.

Source 18 may be configured using other techniques, e.g., acousto-optical modulators (AOMs), described in referenced U.S. patent application Ser. No. 10/765,368 (ZI-47) and Ser. No. 11/204,758 (ZI-57). Source 18 may also be configured using intra-cavity phase modulators and beam deflectors in external cavity diode laser sources (ECDLs) such as described in commonly owned U.S. Provisional Patent Application No. 60/699,951 (ZI-72) and No. 60/805,104 (ZI-78) and US Patent Application filed Jul. 12, 2006 (ZI-72) wherein each of the three applications are entitled "Continuously Tunable External Cavity Diode Laser Sources With High Tuning Rates And Extended Tuning Ranges" by Henry A. Hill, the contents of each of which are herein incorporated in their entirety by reference.

Figure 1B:
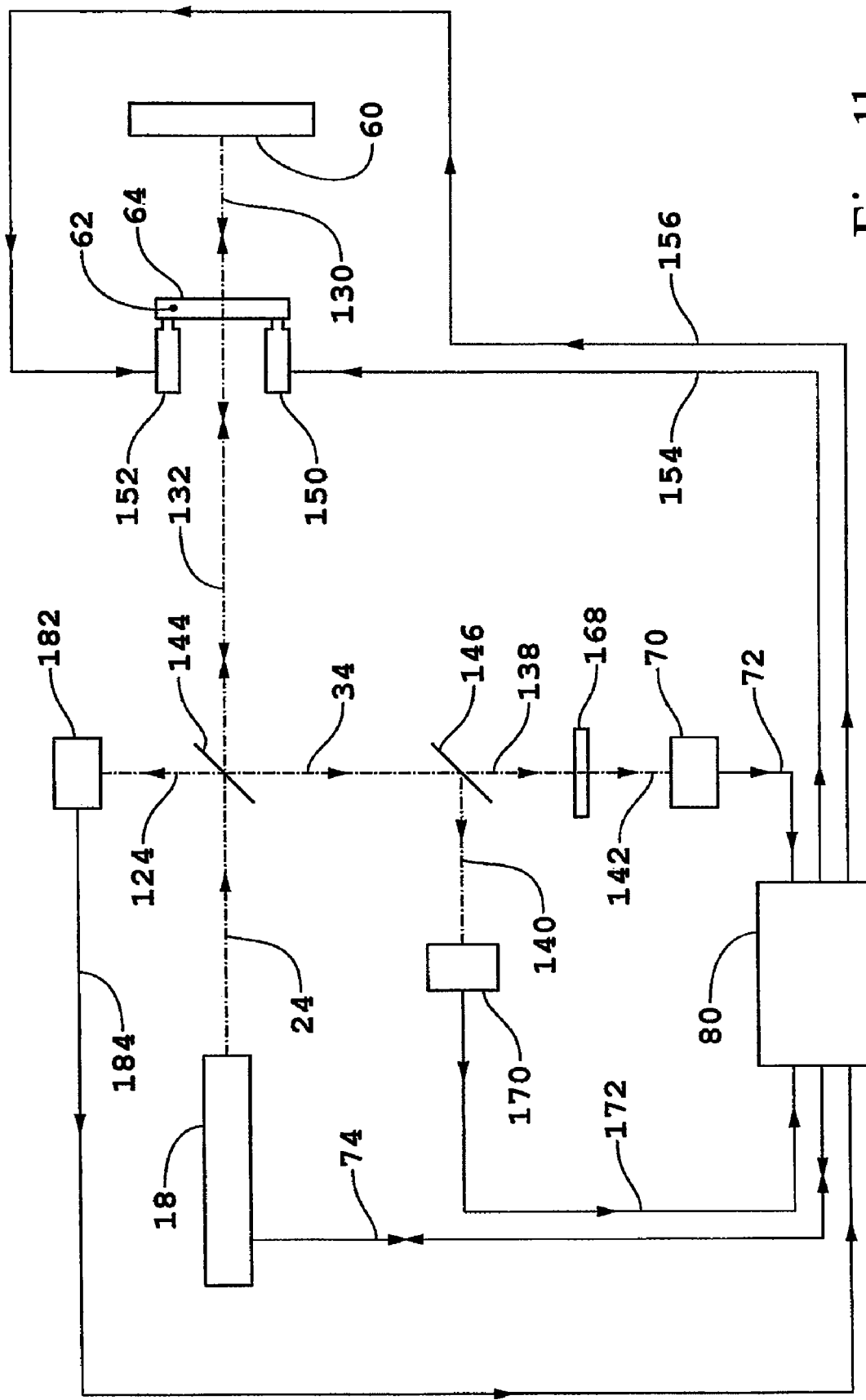
FIG. 1b is a schematic diagram of an interferometric metrology system of the Fizeau type that uses homodyne detection methods and that may be configured to operate with or without use of phase shifting introduced by a relative translation of reference and measurement objects.

The first embodiment of the present invention is shown diagrammatically in FIG. 1*b* and is operated with a reference frame and a reference optical frequency $f_R$ or corresponding reference wavelength $\lambda_R$ wherein the relative optical path length between a spot on surface 64 and a corresponding spot on measurement object 60 is maintained constant mod $2\pi$ at the reference optical frequency $f_R$. The first embodiment comprises interferometer 10 configured as a Fizeau interferometer that uses homodyne detection methods based on a combination of temporal and frequency encoding with or without use of phase shifting introduced by a relative translation of reference and measurement objects 62 and 60. The homodyne detection methods used herein exhibit an intrinsic reduced sensitivity to vibrations and environmental changes.

In FIG. 1*b*, source 18 generates input beam 24 with a single frequency component that is switched between selected frequency values with a switching frequency that is preferably high compared to the frequencies of the effects of vibration and environmental changes that may be present. Source 18 of the first embodiment shown diagrammatically in FIG. 1*c* comprises an ECDL such as described in referenced U.S. Patent Application (ZI-72) filed Jul. 12, 2006. In addition, the reference and measurement beam components of input beam 24 are coextensive in space for the first embodiment.

The ECDL is a continuously tunable external cavity source comprising a coherent light source and a dispersive system. The dispersive system directs a selected wavelength from the coherent light source back into the coherent light source by either diffraction and/or refraction. Two features of an external cavity comprising a dispersive system is a first order sensitivity of the double pass path length of the external cavity to lateral shears of a beam incident on the dispersive system and a first order sensitivity of the wavelength of the selected wavelength to changes in the direction of propagation of a beam incident on a dispersive element of the dispersive system. The ECDL exploits both of these features to obtain continuously tunable external cavity diode laser sources with high tuning rates and extended tuning ranges in comparison to prior art which exploits only the second of the two features.

Figure 1C:
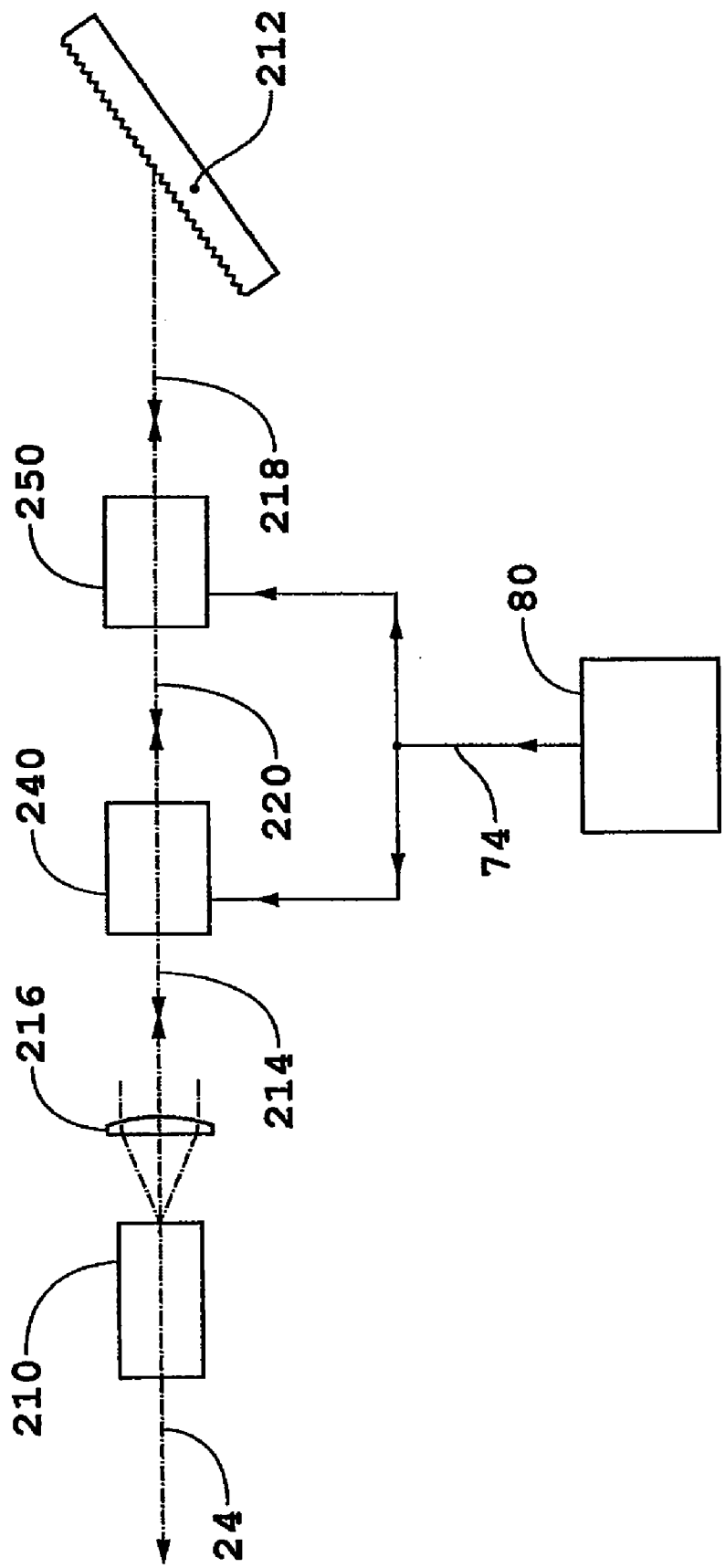
FIG. 1c is a schematic diagram of an external cavity diode laser (ECDL) with phase modulators and beam deflectors in the external cavity.

Source 18 configured as an ECDL in a Littrow configuration is shown diagrammatically in FIG. 1*c* comprising grating 212. The ECDL further comprises laser source 210, beam forming optics 216, phase modulator 240, beam deflector 250, and electronic processor and controller 80. The output beam is beam 24.

Source 210 and beam forming optics 216 generate an intra-cavity collimated beam as a component of beam 214. The collimated component of beam 214 is incident on phase-modulator 240 and a portion thereof is phase modulated as a modulated component of beam 220. A portion of the modulated beam component of beam 220 is subsequently deflected by beam deflector 250 as deflected beam component of beam 218.

For the Littrow cavity configuration shown in FIG. 1*c*, a portion of the deflected component of beam 218 is diffracted as a diffracted component of beam 218. The path of diffracted beam component of beam 218 through the external cavities of FIG. 1*c* to source 210 coincides with the components of the intra-cavity components propagating to the right in FIG. 1*c*. A portion of diffracted beam component of beam 218 incident on source 210 is double passed by the cavity of source 210 after reflection by a reflector on the left side of source 210. The double passed beam corresponds to the component of collimated beam component of beam 214.

Also for the Littrow cavity configuration shown in FIG. 1c, a second portion of the diffracted beam component of beam 218 incident on source 210 is transmitted by the reflector on the left side of source 210 as output beam 24.

The two features of an external cavity with a dispersive system are exploited by the introduction and use of phase modulator 240 and beam deflector 250 which generate both phase shifts and changes in direction of propagation of intra-cavity beams. The amounts of phase shift and change in direction of propagation of the intra-cavity beams generated by phase modulator 240 and beam deflector 250, respectively, are controlled by components of signal 74 from electronic processor and controller 80. Phase modulator 240 and beam deflector 250 may comprise either electro-optic modulators (EOMs) or AOMs. Properties of ECDLs are listed in Table 1 for a set of different media used as birefringent media for phase modulator 240 configured as an EOM.

TABLE 1

Performance Properties Of ECDLs Configured With Electro-Optic Effect Modulators: Littrow External Cavity

| Medium | $\delta f/V$ (MHz/volt) | $V_2$ (volts) | $\delta f$ (GHz) | $\Delta\lambda$ (nm) | $\tau$ (n sec) |
|---|---|---|---|---|---|
| LiNbO$_3$ | 14.4 | 100 | 1.4 | 0.0019 | 12 |
|  |  | 400 | 5.8 | 0.0077 |  |
| BSN x = 0.60 | 126 | 10 | 1.26 | 0.00167 | 18 |
|  |  | 40 | 5.0 | 0.0067 |  |
|  |  | 100 | 12.6 | 0.0167 |  |
|  |  | 400 | 50.2 | 0.0670 |  |
| BSN x = 0.75 | 732 | 10 | 7.3 | 0.0097 | 39 |
|  |  | 40 | 29 | 0.039 |  |
|  |  | 100 | 73 | 0.097 |  |
|  |  | 400 | 293 | 0.39 |  |

The listed values of $V_2$ in Table 1 correspond to the modulus of applied voltage to phase modulator 240 that causes a change $\Delta\lambda$ in selected wavelength and corresponding change $\delta f$ in selected frequency for a central wavelength of 635 nm. The tuning ranges in frequency and wavelength are equal to $2\delta f$ and $2\Delta\lambda$, respectively. The length of the electro-optic effect modulator in phase modulator 240 is assumed to be 75% of the Littrow cavity length. A thickness of $d_z=2.0$ mm is assumed for the electro-optic modulator crystal in the z-direction for the performance properties listed in Table 1. The z-direction is perpendicular to the plane of FIG. 1c. It is relevant to note that the tuning ranges in frequency and wavelength are equal to $2\delta f$ and $2\Delta\lambda$, respectively. The response time $\tau$ listed in the sixth column is defined as the average of the rise and fall times required for a change from 10% of the applied voltage to 90% of the applied voltage for changing the frequency of the ECDL without mode hoping between different longitudinal modes of the external cavity.

Figure 1D:
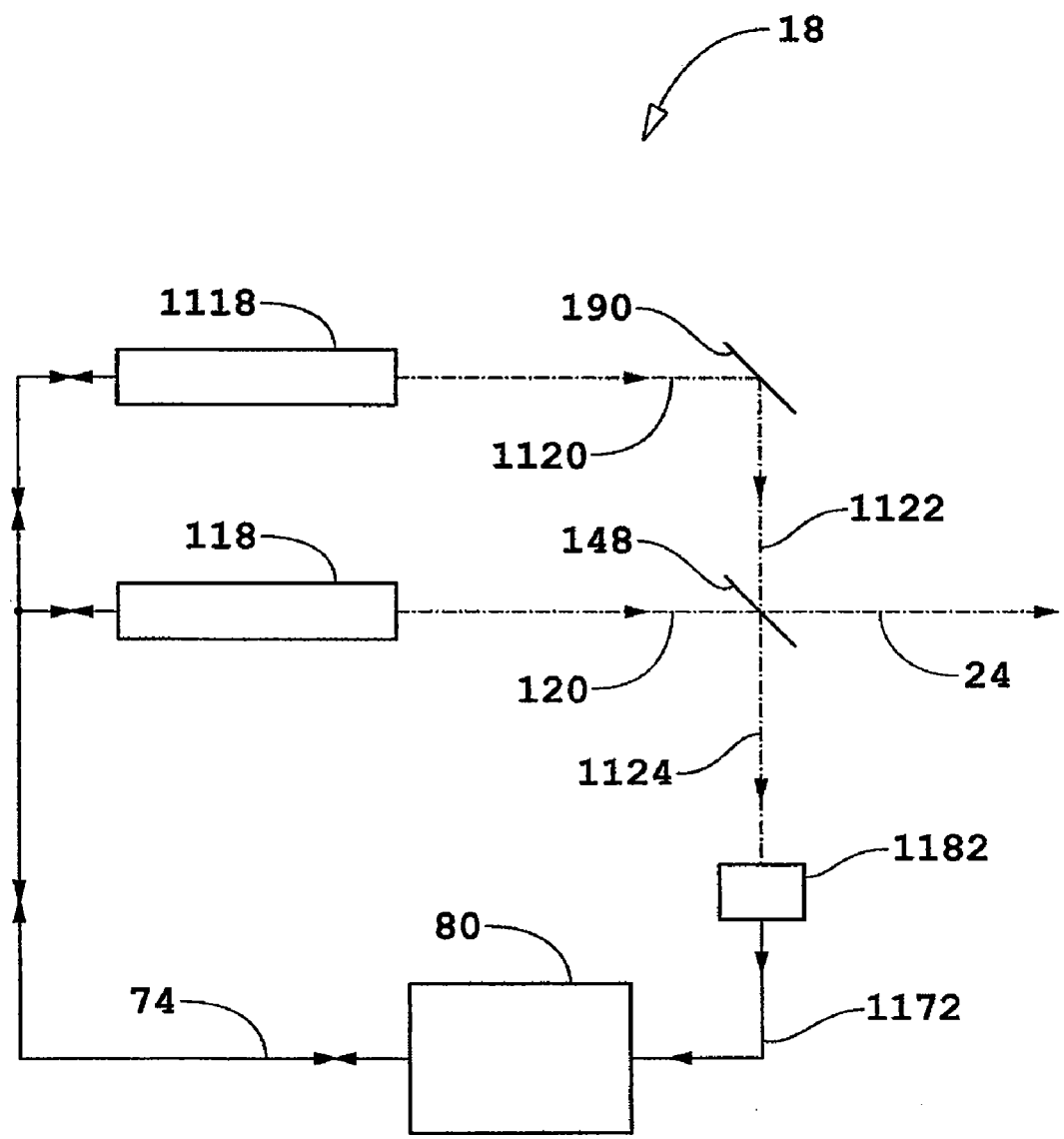
FIG. 1d is a schematic diagram of a source comprising two lasers operating in a master-slave mode.

The function of source 18 in the first embodiment may alternatively be served by use of a master-slave source configuration such as shown diagrammatically in FIG. 1d. With reference to FIG. 1d, the frequency of laser 1118 are controlled by a servo feedback as a component of signal 74 to control the frequency difference between the frequencies of master and slave lasers 118 and 1118, respectively. The frequency of laser 118 is controlled by a component of signal 74 from electronic processor and controller 80. A first portion of beam 120 generated by laser 118 is transmitted by a non-polarizing beam-splitter 148 as a first component of output beam 24 and a second portion of beam 120 is reflected by non-polarizing beam-splitter 148 as a first component of beam 1124. A first portion of Beam 1120 generated by laser 1118 is reflected by mirror 190 as beam 1122. A first portion of beam 1122 is reflected by non-polarizing beam-splitter 148 as a second component of output beam 24 and a second portion of beam 1122 is transmitted by non-polarizing beam-splitter 148 as a second component of beam 124.

The components of beam 1124 are mixed with respect to polarization in detector if beam 1124 is not a mixed beam and detected by detector 1182 preferably by a quantum process to generate electrical interference signal 1172. The difference in frequencies of beams 120 and 1120 corresponds to the frequency of electrical interference signal 1172. The difference in frequencies is compared to a value determined by electronic processor and controller 80 to generate an error signal. The error signal is used by electronic processor and controller 80 to a generate servo control signal component of signal 74 to control the frequency of laser 1118 relative to the frequency of laser 118.

With reference to FIG. 1b, interferometer 10 comprises non-polarizing beam-splitter 144, reference object 62 with reference surface 64; measurement object 60; transducers 150 and 152,; detectors 70, 170, and 182; and electronic processor and controller 80. Input beam 24 is incident on non-polarizing beam splitter 144 and a first portion thereof transmitted as beam 132 and a second portion thereof reflected as monitor beam 124. Beam 132 is subsequently incident on reference object 62 and a first portion thereof reflected by surface 64 of object 62 as a reflected reference beam component of beam 132 and a second portion thereof transmitted as a measurement component of beam 130. The measurement beam component of beam 130 is incident on measurement object 60 and a portion thereof reflected/scattered as a reflected measurement beam component of beam 130. The reflected measurement beam component of beam 130 is incident on reference object 62 and a portion thereof transmitted as the reflected measurement beam component of beam 132. The reflected reference and measurement beam components of beam 132 are next incident on beam-splitter 144 and a portion thereof reflected as output beam 34.

Continuing with the description of the first embodiment, output beam 34 is incident on non-polarizing beam-splitter 146 and first and second portions thereof transmitted and reflected, respectively, as beams 138 and 140, respectively. Beam 138 is detected by detector 70 preferably by a quantum process to generate electrical interference signal 72 after transmission by shutter 168 if required to generate beam 142 as a gated beam. Shutter 168 is controlled by electronic processor and controller 80. The function of shutter may be alternatively served by a shutter integrated into detector 70. Electrical interference signal 72 contains information about the difference in surface profiles of surface 64 and the reflecting surface of measurement object 60.

Beam 140 is incident on and detected by detector 170 preferably by a quantum process to generate electrical interference signal 172. If beam 140 is not a mixed beam, it is passed through an analyzer in detector 170 to form a mixed beam prior to detection by detector 170. Detector 170 comprises one or more high speed detectors where each of the high speed detectors may comprise one or more pixels. The photosensitive areas of each of the one or more high speed detectors overlap a portion of the wavefront of beam 140. Electrical interference signal 172 contains information about the relative changes in the optical path lengths between the reference and measurement objects 62 and 60 at positions corresponding to the portions of the wavefront of beam 140 incident on each of the high speed detectors. The information contained in electrical interference signal 172 is processed and used by electronic processor and controller 80 to establish and maintain the reference frame and to detect changes in relative orientation and/or deformation of the reference and measurement objects 62 and 60.

Beam 124 is incident on detector 182 and detected preferably by a quantum process to generate electrical signal 184. Electrical interference signal 184 is processed and used by electronic processor and controller 80 to monitor and control the amplitude of beam 24 through a component of signal 74.

An advantage is that electrical interference signal 172 is processed by electronic processor and controller 80 using a homodyne detection method that is compatible with the multiple-homodyne detection method used by electronic processor and controller 80 to process electrical interference signal 72. In particular, if the first embodiment is configured to use multiple-homodyne detection methods based on a sequence of $N \geq 3$ phase shift values for the processing of electrical interference signal 72, the homodyne detection method used to process electrical interference signal 172 can be and is configured to operate with the same sequence of $N \geq 3$ phase shift values so as to not impose any restrictions on the selection of sequences of phase shift values and on the processing of electrical interference signals 72.

The homodyne detection method used to process electrical interference signal 172 takes advantage of the property of the multiple-homodyne detection methods wherein joint measurements of components of conjugated quadratures are measured, the temporal encoding used in the multiple-homodyne detection methods, and of the use of the reference frame. The homodyne detection method is in addition different from the multiple-homodyne detection methods with respect to sampling or integration times of respective detectors. The switching time of source 18 and the sampling time or integration time of detector 170 are much less than the inverse of the bandwidth of the effects of vibration and of environmental changes. The sampling time or integration time of detector 70 is based on signal-to-noise considerations including both systematic and statistical error sources. Accordingly, information about changes in the optical path length between the reference and measurement objects 62 and 60 due to effects of vibrations and effects of environmental changes can be obtained without imposing any restrictions on the sampling or integration times of detector 70 or on the processing of electrical interference signals 72.

The homodyne detection method used to process electrical interference signal 172 corresponds to a variant of a single homodyne detection method that takes advantage of the electrical interference signal values 172 being acquired in the reference frame of the first embodiment. In the reference frame, the phase of the conjugated quadratures is maintained zero or substantially zero by a feedback system. As a consequence, only one component of the respective conjugated quadratures needs to be monitored in order to detect changes in the relative displacement of reference and measurement objects 62 and 60. The one component of the respective conjugated quadratures corresponds to the component that is nominally equal to zero and which exhibits an extremum in sensitivity to changes in the relative optical path length. Since the phase shift associated with the difference in frequency of the two components of input beam 24 corresponding to two components of a conjugated quadratures is $\pi/2$, the associated difference between the two respective, i.e., contiguous, interference signal values contains in the first embodiment information about the component of the conjugated quadratures that has an extremum in sensitivity to changes in the relative optical path length. The information is in the form of $\pm$ the component of the conjugated quadratures which will be further described in the description of the first embodiment of the present invention.

The value of the optical frequency of the ECDL used as source 18 is controlled by components of signal 74 from electronic processor and controller 80 as drive voltages $V_1$ and $V_2$ for EOM beam deflectors 140 and 150, respectively. The relationship between $V_1$, $V_2$, and the optical frequency of the ECDL is described in referenced US Patent Application (ZI-72) filed Jul. 12, 2006. The value of the reference frequency $f_R$ will change as the difference in physical path length l between the reference and measurement objects changes due for example to vibrations and as the index of refraction of a refractive medium, e.g., gas, in the optical path of the measurement beam between the reference and measurement objects changes due for example to environmental changes. Changes in the relative optical path length due to vibrations and environmental effects are detected by monitoring the component of the conjugated quadratures of electrical interference signal 172 and the measured changes used as an error signal to control the value of reference frequency $f_R$ by controlling the voltages $V_1$ and $V_2$ such that the optical path length is kept constant mod $2\pi$. Actual knowledge of reference frequency $f_R$ or of the physical path length l is not required.

In a given reference frame, the rate of change of a frequency of beam 24 with respect to the phase of electrical interference signal 72 is required to implement a homodyne detection method. That rate of change is denoted as $f_\pi$, the change in frequency of beam 24 required to introduce a $\pi$ phase shift in the conjugated quadratures representing the electrical interference signal 72. The rate of frequency change per $\pi$ phase shift change $f_\pi$ is determined by first measuring the value of the electrical interference signal value as a function of changes of frequency of the ECDL and then analyzing the measured time sequence of the conjugated quadratures representing the electrical interference signal 72 for a value of $f_\pi$. The measured value of $f_\pi$ is used in the implementation of either single- or multiple homodyne detection methods for electrical interference signal 72.

It is important to note that knowledge of the value of l is not required a priori and as noted above, the actual physical path length difference l is not measured in the determination of $f_\pi$. It is also important to note that the actual value of $f_\pi$ need not be measured or used as a frequency but the corresponding values of changes in voltages, $V_{1,\pi}$ and $V_{2,\pi}$, are measured and subsequently used. Accordingly, the actual physical path length difference l is not measured and can not be determined from knowledge of $V_{1,\pi}$ and $V_{2,\pi}$ without knowledge of the conversion of changes in $V_1$ and $V_2$ to changes in frequency of the ECDL.

Figure 1E:
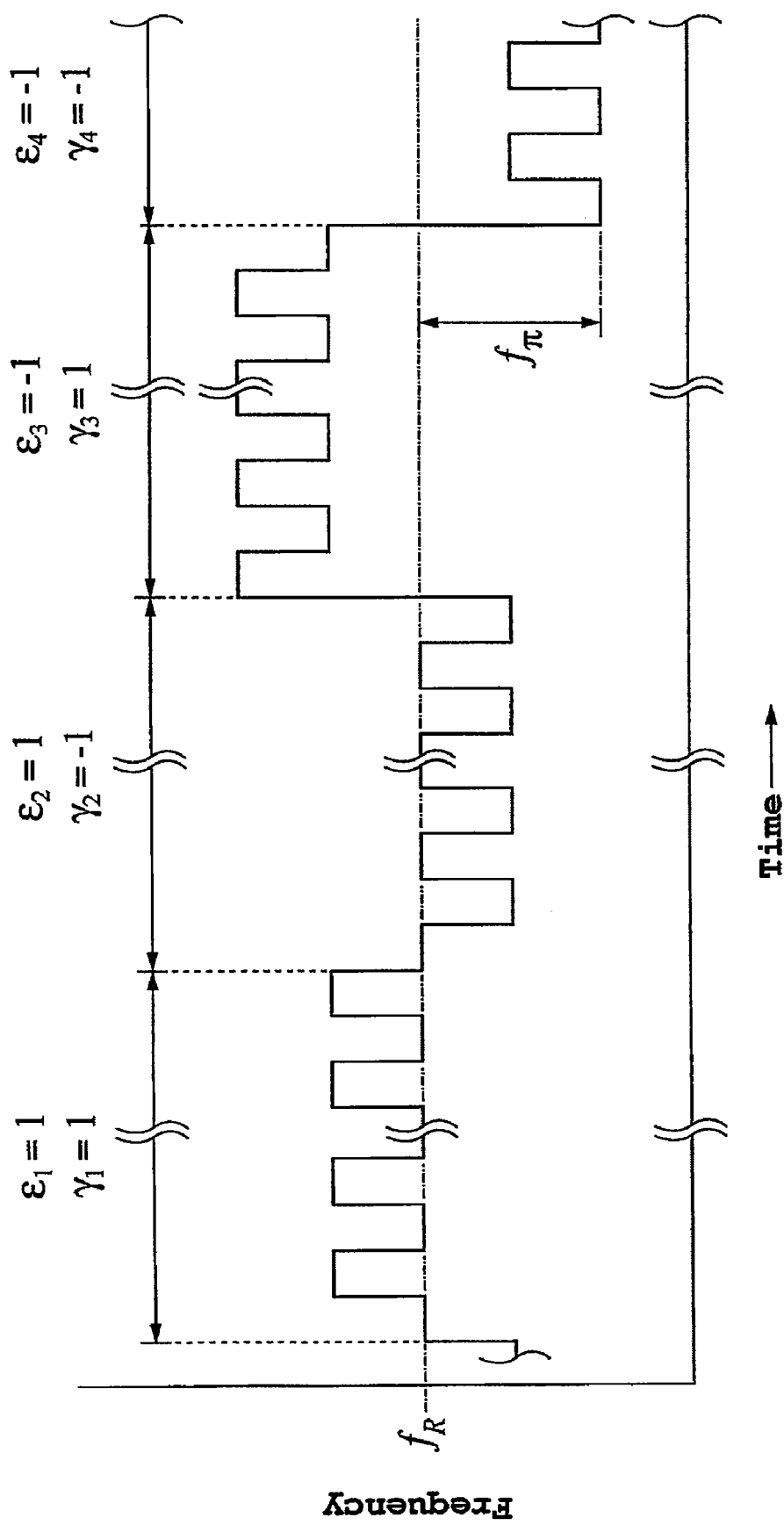
FIG. 1e is a graph showing the temporal properties of the frequency of the output beam from an ECDL with phase modulators and beam deflectors in the external cavity.

The waveforms of drive voltages $V_1$ and $V_2$ are preferably rectangle functions. Shown in FIG. 1e is the corresponding frequency of beam 24. The corresponding binary modulation of the frequency of beam 24 between two different frequency values is used in temporal encoding of the reference and measurement beams and in particular does not generate two frequency components such as when using source 18 configured as a master and slave lasers 118 and 1118. For the multiple-homodyne detection methods, the period of the rectangle functions is much less than the periods defined by the binary states of $\epsilon_j$ and $\gamma_j$ (see the description of $\epsilon_j$ and $\gamma_j$ given herein with respect to the bi-homodyne detection method).

With reference to FIG. 1b, the phase shifting is achieved either with shifting the frequencies of components of input beam 24 or in conjunction with phase shifting introduced by translation and/or rotation of reference object 62 by transducers 150 and 152 which are controlled by signals 154 and 156, respectively, from electronic processor and controller 80. A third transducer located out of the plane of FIG. 1b (not shown in figure) is used to introduce changes in angular orientation of reference object 62 that are orthogonal to the changes in angular orientation introduced by transducers 150 and 152.

By operating in the reference frame, the integration or sampling time for detector 70 can be selected to optimize the signal-to-noise ratio for the conjugated quadratures obtained from analyzing the arrays of electrical interference values 72 independent of vibration effects and environmental effects that generate linear and/or rotational displacement effects. In the reference frame, measurement object 60 is stationary with respect to reference object 62 with respect to linear and/or rotational displacement effects. Therefore the integration or sampling time controlled by shutter 168 or a shutter in detector 70 may be long compared to a characteristic time of vibrations and environmental changes that generate linear and/or rotational displacement effects. The effects of rotation and deformation and gradients in environmental changes can be reduced by a rotation and/or deformation of reference object 62 relative to measurement object 60 by use of transducers and/or compensated in processing of measured arrays of electrical signal values.

Bandwidth for reduction of effects of vibration and environmental changes can be of the order of the maximum frequency switching time of source 18 which is of the order of 1 MHz for a source such as the ECDL described in referenced US Patent Application (ZI-72) filed Jul. 12, 2006. The wavelength of the ECDL may for example be in the visible or infrared. With respect to the signal acquisition and processing, the conjugated quadratures of fields of return measurement beams are obtained by making a set of at least three measurements of the electrical interference signal 72. In the single-homodyne detection method, a known sequence of phase shifts is introduced between the reference beam component and the return measurement beam component of the output beam 34 in the acquisition of the at least three measurements of the electrical interference signal 72. A sequence of commonly used four phase shift values is 0, $\pi/4$, $\pi/2$, and $3\pi/2$. For reference, the data processing procedure used to extract the conjugated quadratures of the reflected/scattered fields for the set of phase shifts values for a single-homodyne detection method is the same as the corresponding procedure described for example in U.S. Pat. No. 6,445,453 (ZI-14) entitled "Scanning Interferometric Near-Field Confocal Microscopy" by Henry A. Hill, the contents of which are incorporated herein in their entirety by reference. The processing procedure is also described by Schwider ibid.

The bi-homodyne detection method uses a single detector element for each electrical interference signal value obtained and an input beam to an interferometer system comprising two encoded components wherein each encoded component corresponds to a component of a conjugated quadratures. The encoding may be employ frequency encoding such as described in referenced U.S. patent application Ser. No. 10/765,368 (ZI-47); polarization encoding such as described in commonly owned U.S. patent application Ser. No. 10/816,180 (ZI-50); temporal encoding such as described in referenced U.S. patent application Ser. No. 11/204,758 (ZI-57); and spatial encoding such as described in referenced U.S. patent application Ser. No. 10/938,408 (ZI-54).

One encoded component of a reference beam and a corresponding encoded component of a measurement beam are used to generate an electrical interference signal component corresponding to a first component of conjugated quadratures of a field of a corresponding measurement beam comprising either a reflected and/or scattered or transmitted field from a spot in or on a measurement object that is conjugate to the detector element. A second encoded component of the reference beam and a corresponding encoded component of the measurement beam are used to generate a second electrical interference signal component corresponding to a respective second component of the conjugated quadratures of the field. Information about the first and second components of the conjugated quadratures are obtained jointly as a consequence of the two encoded components of the reference beam being coextensive in space and the two corresponding encoded components of the measurement beam being coextensive in space and also having the same or effectively the same temporal window function in the interferometer system.

The quad-homodyne detection method uses two detectors and an input beam to an interferometer system comprising four coextensive measurement beams and corresponding reference beams in the interferometer system simultaneously to obtain four electrical signal values wherein each measured value of an electrical interference signal contains simultaneously information about two orthogonal components of a conjugated quadratures for a joint measurement of conjugated quadratures of a field of a beam either reflected and/or scattered or transmitted by a spot on or in a substrate. One detector element is used to obtain two electrical interference signal values and the second detector element is used to obtain two other of the four electrical interference signal values.

The four coextensive measurement beams and corresponding reference beams are generated in the interferometer system simultaneously by using an input beam that comprises four frequency components wherein each frequency component corresponds to a measurement and corresponding reference beam. The frequency differences of the four frequency components are such that the four frequency components are resolved by an analyzer into two beams incident on the two different detector elements wherein each of the two beams comprises two different frequency components and the frequency differences are large compared to the frequency bandwidth of the detector. One of the two frequency components incident on a first detector element is used to generate an electrical interference signal component corresponding to a first component of conjugated quadratures of a field of a corresponding measurement beam comprising either a reflected and/or scattered or transmitted far-field or near-field from a spot in or on a measurement object that is conjugate to a detector element. The second of the two frequency components incident on the first detector element is used to generate a second electrical interference signal component corresponding to a respective second component of the conjugated quadratures of the field. The description for the second detector element with respect to frequency components and components of conjugated quadratures is the same as the corresponding description with respect to the first detector element.

Information about the first and second components of the conjugated quadratures are accordingly obtained jointly as a consequence of the four frequency components being coextensive in space and having the same temporal window function in the interferometer system. The temporal window function when operating in a scanning mode corresponds to the window function or a respective envelop of a frequency component of input beam 24 to the interferometer system.

Referring to the single- and bi-homodyne detection methods used in various embodiments of the present invention, a set of at least three electrical interference signal values are obtained for each spot on and/or in substrate 60 being imaged. The set of at least three electrical interference signal values $S_j$, j=1, 2, 3, . . . , q where q is an integer, used for obtaining conjugated quadratures of fields for a single spot on and/or in a substrate being imaged is represented for the single- and bi-homodyne detection methods within a scale factor by the formula $$S_j = P_j \begin{Bmatrix} \xi_j^2|A_1|^2 + \zeta_j^2|B_1|^2 + \eta_j^2|C_1|^2 + \zeta_j\eta_j2|B_1||C_1|\cos\varphi_{B_1C_1\varepsilon_j} + \\ \xi_j\zeta_j2|A_1||B_1|\cos\varphi_{A_1B_1\varepsilon_j} + \varepsilon_j\xi_j\eta_j2|A_1||C_1|\cos\varphi_{A_1C_1,j} + \\ \xi_j^2|A_2|^2 + \zeta_j^2|B_2|^2 + \eta_j^2|C_2|^2 + \zeta_j\eta_j2|B_2||C_2|\cos\varphi_{B_2C_2\gamma_j} + \\ \xi_j\zeta_j2|A_2||B_2|\cos\varphi_{A_2B_2\gamma_j} + \gamma_j\xi_j\eta_j2|A_2||C_2|\cos\varphi_{A_2C_2,j} \end{Bmatrix} \quad (1)$$

where $\phi_{A_1C_1,j}$ and $\phi_{A_2C_2,j}$ include the effects of the phase shifts introduced by vibrations, environmental changes, and/or a tilt between reference and measurement object 62 and 60; coefficients $A_1$ and $A_2$ represent the amplitudes of the reference beams corresponding to the first and second frequency components of the input beam; coefficients $B_1$ and $B_2$ represent the amplitudes of background beams corresponding to reference beams $A_1$ and $A_2$, respectively; coefficients $C_1$ and $C_2$ represent the amplitudes of the return measurement beams corresponding to reference beams $A_1$ and $A_2$, respectively; $P_j$ represents the integrated intensity of the first frequency component of the input beam during the integration period used by detector 70 to acquire electrical interference signal value $S_j$; and $\epsilon_j = \pm 1$ and $\gamma_j = \pm 1$. The change in the values of $\epsilon_j$ and $\gamma_j$ from 1 to −1 or from −1 to 1 correspond to changes in relative phases of respective reference and measurement beams. The coefficients $\xi_j$, $\zeta_j$, and $\eta_j$ represent effects of variations in properties of a conjugate set of four pinholes such as size and shape if used in the generation of the spot on and/or in substrate 60 and the sensitivities of a conjugate set of four detector pixels corresponding to the spot on and/or in substrate 60 for the reference beam, the background beam, and the return measurement beam, respectively.

A set of values for $\epsilon_j$ and $\gamma_j$ is listed in Table 2 for single-homodyne detection methods when using a set of 4 phase shift values. The phase shifting algorithm corresponding to $\epsilon_j$ and $\gamma_j$ values listed in Table 2 as a schedule 1 corresponds to the algorithm based on the standard set of four phase shift values of 0, π/2, π, and 3π/2. The corresponding single-homodyne detection method exhibits a first order sensitivity to effects of vibrations and environmental changes with a peak in sensitivity at a zero frequency value for components of the Fourier spectrum of effects of vibrations and environmental changes.

TABLE 2

Single-Homodyne Detection Method: Schedule 1

| j | $\epsilon_j$ | $\gamma_j$ | $\epsilon_j\gamma_j$ |
|---|---|---|---|
| 1 | +1 | 0 | 0 |
| 2 | 0 | +1 | 0 |
| 3 | −1 | 0 | 0 |
| 4 | 0 | −1 | 0 |

A phase shift algorithm based on five phase shift values that exhibits a second order sensitivity to effects of vibrations and environmental changes was introduced by J. Schwider, R. Burow, K.-E. Elssner, J. Grzanna, R. Spolaczyk, and K. Merkel in an article entitled "Digital wave-front measuring interferometry: some systematic error sources," *Appl. Opt.* 22, pp 3421-3432 (1983) (also see discussion by P. de Groot in an article entitled "Vibration in phase-shifting interferometry," *J. Opt. Soc. Am. A* 12, pp 354-365 (1995)). The phase shift algorithm based on five phase shift values exhibits in addition to the second order sensitivity a peak in sensitivity at a non-zero frequency value for components of the Fourier spectrum of effects of vibrations and environmental changes. The phase shift algorithm based on five phase shift values was later popularized by P. Hariharan, B. F. Oreb, and T. Eiju in an article entitled "Digital phase-shifting interferometry: a simple error-compensating phase calculation algorithm," *Appl. Opt.* 26, pp 2504-2506 (1987) and by J. E. Breivenkamp and J. H. Bruning in an article entitled "Phase shifting interferometry," in *Optical Shop Testing*, D. Malacara, Ed. (Wiley, New York, 1992). The advantage represented by a second order sensitivity as compared to a first order sensitivity has been important for large-aperture interferometry because of the difficulty in precisely calibrating piezoelectric transducers that perform the phase stepping and because of complications that arise with fast spherical cavities.

There are sets of four phase shift values disclosed herein for use in single-homodyne detection methods that also exhibit only a second order sensitivity to effects of vibrations and environmental changes, e.g., a first set 0, π/2, −π/2, and ±π and a second set π/2, 0, ±π, and −π/2. A set of values of $\epsilon_j$ and $\gamma_j$ corresponding to a second set of phase shifts 0, π/2, −π/2, and ±π is listed in Table 3 as Schedule 2. The algorithm based on the first set of phase shift values listed in Table 3 exhibits only a second order sensitivity to effects of vibrations and environmental changes with a peak in sensitivity at a non-zero frequency value for components of the Fourier spectrum of effects of vibrations and environmental changes.

Table 4 lists as schedule 3 a set of values for $\epsilon_j$ and $\gamma_j$ for a bi-homodyne detection method that corresponds to the standard set of phase shifts 0, π/2, π, and 3π/2 which is the same as Table 1 in referenced U.S. patent application Ser. No. 10/765,368 (ZI-47). The bi-homodyne detection method using the set of values of $\epsilon_j$ and $\gamma_j$ listed in Table 4 exhibits a first order sensitivity to effects of vibration and environmental changes with a peak in sensitivity at a zero frequency value for components of the Fourier spectrum of effects of vibrations and environmental changes.

TABLE 3

Single-Homodyne Detection Method: Schedule 2

| j | $\epsilon_j$ | $\gamma_j$ | $\epsilon_j\gamma_j$ |
|---|---|---|---|
| 1 | +1 | 0 | 0 |
| 2 | 0 | +1 | 0 |
| 3 | 0 | −1 | 0 |
| 4 | −1 | 0 | 0 |

TABLE 4

Bi-Homodyne Detection Method: Schedule 3

| j | $\epsilon_j$ | $\gamma_j$ | $\epsilon_j\gamma_j$ |
|---|---|---|---|
| 1 | +1 | +1 | +1 |
| 2 | −1 | −1 | +1 |
| 3 | −1 | +1 | −1 |
| 4 | +1 | −1 | −1 |

There are disclosed herein sets of values of $\epsilon_j$ and $\gamma_j$, an example of which is listed in Table 5 as schedule 4, for a bi-homodyne detection method that exhibits for a sequence of q phase shift values where q is an even integer value a second order sensitivity to effects of vibrations and environmental changes with a peak in sensitivity at a non-zero frequency value for components of the Fourier spectrum of effects of vibrations and environmental changes. The properties of the bi-homodyne detection methods with respect to

TABLE 5

Bi-Homodyne Detection Method: Schedule 4
$q \leq 10$

| j | $\epsilon_j$ | $\gamma_j$ | $\epsilon_j \gamma_j$ |
|---|---|---|---|
| 1 | +1 | +1 | +1 |
| 2 | +1 | −1 | −1 |
| 3 | −1 | +1 | −1 |
| 4 | −1 | −1 | +1 |
| 5 | +1 | +1 | +1 |
| 6 | +1 | −1 | −1 |
| 7 | −1 | +1 | −1 |
| 8 | −1 | −1 | +1 | whether there is a second order sensitivity to effects of vibrations and environmental changed is determined by the symmetry properties of $\epsilon_j \gamma_j$ about the value of j, i.e., j=(q+1)/2. The second order sensitivity to effects of vibration and environmental changes is further described in the description of the first embodiments of the present invention.

In summary, the single homodyne set of $\epsilon_j$ and $\gamma_j$ given in Table 2 and the bi-homodyne set of $\epsilon_j$ and $\gamma_j$ given in Table 4 lead to first order sensitivities of respective measured conjugated quadratures to vibrations and environmental changes with a peak in sensitivity at a zero frequency value for components of the Fourier spectrum of effects of vibrations and environmental changes and the single homodyne set of $\epsilon_j$ and $\gamma_j$ given in Table 3 and the bi-homodyne set of $\epsilon_j$ and $\gamma_j$ given in Table 5 lead for values of q=4 and 8 to second order sensitivities of respective measured conjugated quadratures to vibrations and environmental changes with a peak in sensitivity at a non-zero frequency value for components of the Fourier spectrum of effects of vibrations and environmental changes approximately zero frequencies. These properties with respect to Tables 2, 3, 4, and 5 are developed in the subsequent description of the first embodiment of the present invention as well the properties with respect to representation or appearance of the effects of vibrations and environmental changes as cyclic errors.

Note that first four rows of Table 5 are obtained from Table 4 by the simple permutation of row 2 and row 4.

It is assumed in Eq. (1) that the ratio of $|A_2|/|A_1|$ is not dependent on j or on the value of $P_j$. In order to simplify the representation of $S_j$ so as to project the important features without departing from either the scope or spirit of the present invention, it is also assumed in Eq. (1) that the ratio of the amplitudes of the return measurement beams corresponding to $A_2$ and $A_1$ is not dependent on j or on the value of $P_j$ although this can be accommodated in the first embodiment by replacing $P_j$ with $P_{j,m}$ for amplitude $A_m$. However, the ratio $|C_2|/|C_1|$ will be different from the ratio $|A_2|/|A_1|$ when the ratio of the amplitudes of the measurement beam components corresponding to $A_2$ and $A_1$ are different from the ratio $|A_2|/|A_1|$.

Noting that $\cos \phi_{A_2 C_2,j} = \pm \sin \phi_{A_1 C_1,j}$ by the control of the relative phase shifts between corresponding reference and return measurement beam components in beam 34, Eq. (1) may be rewritten as $$S_j = P_j \left\{ \begin{array}{l} \xi_j^2(|A_1|^2 + |A_2|^2) + \zeta_j^2(|B_1|^2 + |B_2|^2) + \eta_j^2(|C_1|^2 + |C_2|^2) + \\ 2\xi_j \zeta_j (|A_1||B_1|\cos\varphi_{A_1 B_1 \epsilon_j} + |A_2||B_2|\cos\varphi_{A_2 B_2 \gamma_j}) + \\ 2\xi_j \eta_j [\epsilon_j |A_1||C_1|\cos\varphi_{A_1 C_1,j} + \\ \gamma_j \left(\frac{|A_2|}{|A_1|}\right)\left(\frac{|C_2|}{|C_1|}\right)|A_1||C_1|\sin\varphi_{A_1 C_1,j}] + \\ 2\zeta_j \eta_j (\epsilon_j |B_1||C_1|\cos\varphi_{B_1 C_1 \epsilon_j} + \gamma_j |B_2||C_2|\cos\varphi_{B_2 C_2 \gamma_j}) \end{array} \right\} \quad (2)$$

where the relationship $\cos \phi_{A_2 C_2,j} = \sin \phi_{A_1 C_1,j}$ has been used without departing from either the scope or spirit of the present invention.

The change in phase $\phi_{A_1 B_1 \epsilon_j}$ for a change in $\epsilon_j$ and the change in phase $\phi_{A_1 B_1 \epsilon_j}$ for a change in $\gamma_j$ may be different from $\pi$ in embodiments depending on where and how the background beam is generated. It may be of value in evaluating the effects of the background beams to note that the factor $\cos \phi_{B_1 C_1 \epsilon_j}$ may be written as $\cos[\phi_{A_1 C_1,j} + (\phi_{B_1 C_1 \epsilon_j} - \phi_{A_1 C_1,j})]$ where the phase difference $(\phi_{B_1 C_1 \epsilon_j} - \phi_{A_1 C_1,j})$ is the same as the phase $\phi_{A_1 B_1 \epsilon_j}$, i.e., $\cos \phi_{B_1 C_1 \epsilon_j} = \cos(\phi_{A_1 C_1,j} + \phi_{A_1 B_1 \epsilon_j})$.

It is evident from inspection of Eq. (2) that the term in Eq. (2) corresponding to the component of conjugated quadratures $|C_1|\cos \phi_{A_1 C_1,j}$ is a rectangular function that has a mean value of zero and is antisymmetric about j=2.5 since $\epsilon_j$ is antisymmetric about j=2.5 with respect to the values of $\epsilon_j$ in Table 4 and has a mean value of zero and is antisymmetric about j=(q+1)/2 for q=4, 8, . . . since $\epsilon_j$ is antisymmetric about j=(q+1)/2 with respect to the values of $\epsilon_j$ in Table 5. In addition the term in Eq. (2) corresponding to the component of conjugated quadratures $|C_1|\sin \phi_{A_1 C_1,j}$ in Eq. (2) is a rectangular function that has a mean value of zero and is antisymmetric about j=(q+1)/2 for q=4, 8, . . . since $\gamma_j$ is a antisymmetric function about j=(q+1)/2 with respect to the respective values of $\gamma_j$ in both Tables 4 and 5. Another important property by the design of the bi-homodyne detection method for values of q=4 and 8 is that the conjugated quadratures $|C_1|\cos \phi_{A_1 C_1,j}$ and $|C_1|\sin \phi_{A_1 C_1,j}$ terms are orthogonal over the range of j=1, 2, . . . , q since $\epsilon_j$ and $\gamma_j$ are orthogonal over the range of j=1, 2, . . . , q, i.e., $$\sum_{j=1}^{q} \epsilon_j \gamma_j = 0$$

with respect to the values of corresponding $\epsilon_j$ and $\gamma_j$ in both Tables 4 and 5.

Information about conjugated quadratures $|C_1|\cos \phi_{A_1 C_1,j}$ and $|C_1|\sin \phi_{A_1 C_1,j}$ are obtained using the symmetric and anti-symmetric properties and orthogonality property of the conjugated quadratures terms in Eq. (2) as represented by the following digital filters applied to the signal values $S_j$ for the cases of q=4, 8, . . . :

$$F_1(S) = \sum_{j=1}^{q} \epsilon_j \frac{S_j}{P_j' \xi_j'^2} = (|A_1|^2 + |A_2|^2) \sum_{j=1}^{m} \epsilon_j \left(\frac{P_j}{P_j'}\right)\left(\frac{\xi_j^2}{\xi_j'^2}\right) + \quad (3)$$

$$(|B_1|^2 + |B_2|^2) \sum_{j=1}^{q} \epsilon_j \left(\frac{P_j}{P_j'}\right)\left(\frac{\xi_j^2}{\xi_j'^2}\right) +$$

-continued $$(|C_1|^2 + |C_2|^2) \sum_{j=1}^{m} \varepsilon_j \left(\frac{P_j}{P_j'}\right)\left(\frac{\eta_j^2}{\xi_j'^2}\right) +$$

$$2|A_1||C_1| \sum_{j=1}^{q} \varepsilon_j^2 \left(\frac{P_j}{P_j'}\right)\left(\frac{\xi_j \zeta_j}{\xi_j'^2}\right) \cos\varphi_{A_1 C_1, j} +$$

$$2\left(\frac{|A_2|}{|A_1|}\right)\left(\frac{|C_2|}{|C_1|}\right)|A_1||C_1| \sum_{j=1}^{q} \varepsilon_j \gamma_j \left(\frac{P_j}{P_j'}\right)\left(\frac{\xi_j \zeta_j}{\xi_j'^2}\right) \sin\varphi_{A_1 C_1, j} +$$

$$2|A_1||B_1| \sum_{j=1}^{q} \varepsilon_j \left(\frac{P_j}{P_j'}\right)\left(\frac{\xi_j \zeta_j}{\xi_j'^2}\right) \cos\varphi_{A_1 B_1 \varepsilon_j} +$$

$$|A_2||B_2| \sum_{j=1}^{q} \varepsilon_j \left(\frac{P_j}{P_j'}\right)\left(\frac{\xi_j \zeta_j}{\xi_j'^2}\right) \cos\varphi_{A_2 B_2 \gamma_j} +$$

$$2|B_1||C_1| \sum_{j=1}^{q} \left(\frac{P_j}{P_j'}\right)\left(\frac{\zeta_j \eta_j}{\xi_j'^2}\right) \cos\varphi_{B_1 C_1 \varepsilon_j} +$$

$$2|B_2||C_2| \sum_{j=1}^{q} \varepsilon_j \gamma_j \left(\frac{P_j}{P_j'}\right)\left(\frac{\zeta_j \eta_j}{\xi_j'^2}\right) \cos\varphi_{B_2 C_2 \gamma_j},$$

$$F_2(S) = \sum_{j=1}^{q} \gamma_j \frac{S_j}{P_j' \xi_j'^2} = (|A_1|^2 + |A_2|^2) \sum_{j=1}^{m} \gamma_j \left(\frac{P_j}{P_j'}\right)\left(\frac{\xi_j^2}{\xi_j'^2}\right) + \quad (4)$$

$$(|B_1|^2 + |B_2|^2) \sum_{j=1}^{m} \gamma_j \left(\frac{P_j}{P_j'}\right)\left(\frac{\zeta_j^2}{\xi_j'^2}\right) +$$

$$(|C_1|^2 + |C_2|^2) \sum_{j=1}^{m} \gamma_j \left(\frac{P_j}{P_j'}\right)\left(\frac{\eta_j^2}{\xi_j'^2}\right) +$$

$$2|A_1||C_1| \sum_{j=1}^{q} \varepsilon_j \gamma_j \left(\frac{P_j}{P_j'}\right)\left(\frac{\xi_j \zeta_j}{\xi_j'^2}\right) \cos\varphi_{A_1 C_1, j} +$$

$$2\left(\frac{|A_2|}{|A_1|}\right)\left(\frac{|C_2|}{|C_1|}\right)|A_1||C_1| \sum_{j=1}^{q} \gamma_j^2 \left(\frac{P_j}{P_j'}\right)\left(\frac{\xi_j \zeta_j}{\xi_j'^2}\right) \sin\varphi_{A_1 C_1, j} +$$

$$2|A_1||B_1| \sum_{j=1}^{q} \gamma_j \left(\frac{P_j}{P_j'}\right)\left(\frac{\xi_j \zeta_j}{\xi_j'^2}\right) \cos\varphi_{A_1 B_1 \varepsilon_j} +$$

$$2|A_2||B_2| \sum_{j=1}^{q} \gamma_j \left(\frac{P_j}{P_j'}\right)\left(\frac{\xi_j \zeta_j}{\xi_j'^2}\right) \cos\varphi_{A_2 B_2 \gamma_j} +$$

$$2|B_1||C_1| \sum_{j=1}^{q} \varepsilon_j \gamma_j \left(\frac{P_j}{P_j'}\right)\left(\frac{\zeta_j \eta_j}{\xi_j'^2}\right) \cos\varphi_{B_1 C_1 \varepsilon_j} +$$

$$2|B_2||C_2| \sum_{j=1}^{q} \left(\frac{P_j}{P_j'}\right)\left(\frac{\zeta_j \eta_j}{\xi_j'^2}\right) \cos\varphi_{B_2 C_2 \gamma_j}$$

where $\xi_j'$ and $P_j'$ are values used in the digital filters to represent $\xi_j$ and $P_j$.

The parameter $$\left[\left(\frac{|A_2|}{|A_1|}\right)\left(\frac{|C_2|}{|C_1|}\right)\right] \quad (5)$$

in Eqs. (3) and (4) needs to be determined in order complete the determination of a conjugated quadratures. The parameter given in Eq. (5) can be measured for example by introducing $\pi/2$ phase shifts into the relative phase of the reference beam and the measurement beam and repeating the measurement for the conjugated quadratures. The ratio of the amplitudes of the conjugated quadratures corresponding to $(\sin \phi_{A_1 C_1}/\cos \phi_{A_1 C_1})$ from the first measurement divided by the ratio of the amplitudes of the conjugated quadratures corresponding to $(\sin \phi_{A_1 C_1}/\cos \phi_{A_1 C_1})$ from the second measurement is equal to $$\left[\left(\frac{|A_2|}{|A_1|}\right)\left(\frac{|C_2|}{|C_1|}\right)\right]^2. \quad (6)$$

Note that certain of the factors in Eqs. (3) and (4) have nominal values of q within scale factors, e.g., $$\sum_{j=1}^{q} \left(\frac{P_j}{P_j'}\right)\left(\frac{\xi_j \eta_j}{\xi_j'^2}\right) \simeq q, \quad (7)$$

$$\sum_{j=1}^{q} \left(\frac{P_j}{P_j'}\right)\left(\frac{\zeta_j \eta_j}{\xi_j'^2}\right) \simeq q.$$

The scale factors correspond to the average values for the ratios of $\xi_j'/\eta_j$ and $\xi_j'/\zeta_j$, respectively, assuming that the average value of $P_j/P_j' \simeq 1$. Certain other of the factors in Eqs. (3) and (4) have nominal values of zero for values of q=4, 8, ..., e.g., $$\sum_{j=1}^{q} \varepsilon_j \left(\frac{P_j}{P_j'}\right)\left(\frac{\xi_j^2}{\xi_j'^2}\right) \simeq 0, \quad \sum_{j=1}^{q} \varepsilon_j \left(\frac{P_j}{P_j'}\right)\left(\frac{\zeta_j^2}{\xi_j'^2}\right) \simeq 0, \quad (8)$$

$$\sum_{j=1}^{q} \varepsilon_j \left(\frac{P_j}{P_j'}\right)\left(\frac{\eta_j^2}{\xi_j'^2}\right) \simeq 0,$$

$$\sum_{j=1}^{q} \gamma_j \left(\frac{P_j}{P_j'}\right)\left(\frac{\xi_j^2}{\xi_j'^2}\right) \simeq 0, \quad \sum_{j=1}^{q} \gamma_j \left(\frac{P_j}{P_j'}\right)\left(\frac{\zeta_j^2}{\xi_j'^2}\right) \simeq 0,$$

$$\sum_{j=1}^{q} \gamma_j \left(\frac{P_j}{P_j'}\right)\left(\frac{\eta_j^2}{\xi_j'^2}\right) \simeq 0,$$

$$\sum_{j=1}^{q} \varepsilon_j \gamma_j \left(\frac{P_j}{P_j'}\right)\left(\frac{\xi_j \eta_j}{\xi_j'^2}\right) \simeq 0.$$

The remaining factors, $$\sum_{j=1}^{q} \varepsilon_j \left(\frac{P_j}{P'_j}\right)\left(\frac{\xi_j \zeta_j}{\xi'^2_j}\right) \cos\varphi_{A_1 B_1 \varepsilon_j}, \quad \sum_{j=1}^{q} \varepsilon_j \left(\frac{P_j}{P'_j}\right)\left(\frac{\xi_j \zeta_j}{\xi'^2_j}\right) \cos\varphi_{A_2 B_2 \gamma_j}, \quad (9)$$

$$\sum_{j=1}^{q} \left(\frac{P_j}{P'_j}\right)\left(\frac{\zeta_j \eta_j}{\xi'^2_j}\right) \cos\varphi_{B_1 C_1 \varepsilon_j}, \quad \sum_{j=1}^{q} \varepsilon_j \gamma_j \left(\frac{P_j}{P'_j}\right)\left(\frac{\zeta_j \eta_j}{\xi'^2_j}\right) \cos\varphi_{B_2 C_2 \gamma_j},$$

$$\sum_{j=1}^{q} \gamma_j \left(\frac{P_j}{P'_j}\right)\left(\frac{\xi_j \zeta_j}{\xi'^2_j}\right) \cos\varphi_{A_1 B_1 \varepsilon_j}, \quad \sum_{j=1}^{q} \gamma_j \left(\frac{P_j}{P'_j}\right)\left(\frac{\xi_j \zeta_j}{\xi'^2_j}\right) \cos\varphi_{A_2 B_2 \gamma_j},$$

$$\sum_{j=1}^{q} \gamma_j \left(\frac{P_j}{P'_j}\right)\left(\frac{\zeta_j \eta_j}{\xi'^2_j}\right) \cos\varphi_{B_1 C_1 \varepsilon_j}, \quad \sum_{j=1}^{q} \left(\frac{P_j}{P'_j}\right)\left(\frac{\zeta_j \eta_j}{\xi'^2_j}\right) \cos\varphi_{B_2 C_2 \gamma_j}.$$

will have for values of $q=4, 8, \ldots$ nominal magnitudes ranging from approximately zero to approximately $q$ times a cosine factor and either the average value of factor $(P_j/P'_j)(\xi_j\zeta_j/\xi'^2_j)$ or $(P_j/P'_j)(\xi_j\eta_j/\xi'^2_j)$ depending on the properties respective phases. For the portion of the background with phases that do not track to a first approximation the phases of the respective measurement beams, the magnitudes of all of the terms listed in the Eq. (9) will be approximately zero. For the portion of the background with phases that do track to a first approximation the phases of the respective measurement beams, the magnitudes of the terms listed in Eq. (9) will be approximately $q$ times a cosine factor and either the average value of factor $(P_j/P'_j)(\xi_j\zeta_j/\xi'^2_j)$ and or factor $(P_j/P'_j)(\zeta_j\eta_j/\xi'^2_j)$.

The two largest terms in Eqs. (3) and (4) are generally the terms that have the factors $(|A_1|^2+|A_2|^2)$ and $(|B_1|^2+|B_2|^2)$. However, the corresponding terms are substantially eliminated by selection of $\xi'_j$ values for the terms that have $(|A_1|^2+|A_2|^2)$ as a factor and by the design of $\xi_j$ values for the terms that have $(|B_1|^2+|B_2|^2)$ as a factor as shown in Eqs. (3) and (4).

The largest contribution from effects of background is represented by the contribution to the interference term between the reference beam and the portion of the background beam generated by the measurement beam 30A. This portion of the effect of the background can be measured by measuring the corresponding conjugated quadratures of the portion of the background with the return measurement beam component of beam 34 set equal to zero, i.e., measuring the respective electrical interference signals $S_j$ with substrate 60 removed and with either $|A_2|=0$ or $|A_1|=0$ and visa versa. The measured conjugated quadratures of the portion of the effect of the background can then used to compensate for the respective background effects beneficially in an end use application if required.

Information about the largest contribution from effects of background amplitude $2\xi_j\zeta_j|A_1||B_1|$ and phase $\phi_{A_1B_1\varepsilon_j}$, i.e., the interference term between the reference beam and the portion of background beam generated by the measurement beam 30A, may be obtained by measuring $S_j$ for $j=1, 2, \ldots, q$ as a function of relative phase shift between reference beam and the measurement beam 30A with substrate 60 removed and either $|A_2|=0$ or $|A_1|=0$ and visa versa and Fourier analyzing the measured values of $S_j$. Such information can be used to help identify the origin of the respective background.

Other techniques may be incorporated into various embodiments of the present invention to reduce and/or compensate for the effects of background beams without departing from either the scope or spirit of the present invention such as described in commonly owned U.S. Pat. No. 5,760,901 entitled "Method And Apparatus For Confocal Interference Microscopy With Background Amplitude Reduction and Compensation," U.S. Pat. No. 5,915,048 entitled "Method and Apparatus for Discrimination In-Focus Images from Out-of-Focus Light Signals from Background and Foreground Light Sources," and U.S. Pat. No. 6,480,285 B1 wherein each of the three patents are by Henry A. Hill. The contents of each of the three patents are herein incorporated in their entirety by reference.

The selection of values for $\xi'_j$ is based on information about coefficients $\xi_j$ for $j=1, 2, \ldots, q$ that may be obtained by measuring the $S_j$ for $j=1, 2, \ldots, q$ with only the reference beam present in the interferometer system. In certain embodiments of the present invention, this may correspond simply blocking the measurement beam components of input beam 24 and in certain other embodiments, this may correspond to simply measuring the $S_j$ for $j=1, 2, \ldots, q$ with substrate 60 removed.

A test of the correctness of a set of values for $\xi'_j$ is the degree to which the $(|A_1|^2+|A_2|^2)$ terms in Eqs. (3) and (4) are zero for even values of $q=4, 8, \ldots$ (see subsequent description of the section entitled herein as "Interpretation of Effects of Vibrations and Environmental Changes as Cyclic Errors").

Information about coefficients $\xi_j\eta_j$ for $j=1, 2, \ldots, q$ may be obtained by scanning an artifact past the spots corresponding to the respective $q$ conjugate detector pixels with either $|A_2|=0$ or $|A_1|=0$ and measuring the conjugated quadratures component $2|A_1||C_1|\cos\phi_{A_1C_1}$ or $2|A_1||C_1|\sin\phi_{A_1C_1}$, respectively. A change in the amplitude of the $2|A_1||C_1|\cos\phi_{A_1C_1}$ or $2|A_1||C_1|\sin\phi_{A_1C_1}$ term corresponds to a variation in $\xi_j\eta_j$ as a function of $j$. Information about the coefficients $\xi_j\eta_j$ for $j=1, 2, \ldots, q$ may be used for example to monitor the stability of one or more elements of interferometer system 10.

Detector 70 may comprise a CCD configured with an architecture that pairs each photosensitive pixel with a blanked-off storage pixel to which the integrated charge is shifted at the moment of an interline transfer. The interline transfer occurs in <1 µs and separates the odd and even fields of one image frame. If used with shutter 68 operated as synchronized shutter, adjacent integrations for corresponding electrical interference signal values, e.g., $S_j$ and $S_{j+1}$, of a millisecond or less can be recorded on either side of the moment of the line transfer. The interlaced electrical interference signal values may than be read-out at the frame rate of the respective CCD. With a readout system of this CCD configuration, the time to complete the acquisition of a sequence of the electrical signal values with $q=4$ is equal to the inverse of the frame read-out rate.

It is important that the advantage of using the CCD configured with the interline transfer architecture is enabled by the use of source 18 based on the ECDL described in referenced U.S. Patent Application (ZI-72) filed Jul. 12, 2006 wherein the frequency of beam 24 can be switched at high rates, e.g., a MHz.

The bi-homodyne detection method is a robust technique for the determination of conjugated quadratures of fields. First, the conjugated quadratures $|C_1|\cos\phi_{A_1C_1}$ and $|C_1|\sin\phi_{A_1C_1}$ are the primary terms in the digitally filtered values $F_1(S)$ and $F_2(S)$, respectively, as expressed by Eqs. (3) and (4), respectively, since as noted in the discussion with respect to Eqs. (3) and (4), the terms with the factors $(|A_1|^2+|A_2|^2)$ and $(|B_1|^2+|B_2|^2)$ are substantially zero for even values of $q$.

Secondly, the coefficients of factors $|C_1|\cos\phi_{A_1C_1}$ and $|C_2|\sin\phi_{A_1C_1}$ in Eqs. (3) and (4) are identical. Thus highly accurate measurements of the interference terms between the return measurement beam and the reference beam with respect to amplitudes and phases, i.e., highly accurate measurements of conjugated quadratures of fields can be measured wherein first order variations in $\xi_j$ and first order errors in normalizations such as $(P_j/P'_j)$ and $(\xi_j^2/\xi'^2_j)$ enter in only second or higher order. This property translates into a significant advantage. Also, the contributions to each component of the conjugated quadratures $|C_1|\cos\phi_{A_1C_1}$ and $|C_2|\sin\phi_{A_1C_1}$ from a respective set of q electrical interference signal values have the same window function and thus are obtained as jointly determined values.

Another distinguishing feature of the bi-homodyne technique is evident in Eqs. (3) and (4): the coefficients of the conjugated quadratures $|C_1|\cos\phi_{A_1C_1}$ and $|C_1|\sin\phi_{A_1C_1}$ in Eqs. (3) and (4), respectively, corresponding to the first equation of Eqs. (7) are identical independent of errors in assumed values for $\xi'_j$ and the coefficients of the conjugated quadratures $|C_1|\sin\phi_{A_1C_1}$ and $|C_1|\cos\phi_{A_1C_1}$ in Eqs. (3) and (4), respectively, corresponding to the last equation of Eqs. (8) are identical independent of errors in assumed values for $\xi'_j$. Thus highly accurate values of the phases corresponding to conjugated quadratures can be measured with first order variations in $\xi_j$ and first order errors in normalizations such as $(P_j/P'_j)$ and $(\xi_j^2/\xi'^2_j)$ enter in only through some high order effect.

A yet other distinguishing feature of the bi-homodyne technique is evident in Eqs. (3) and (4): for $|\tan\phi_{A_1C_1}|\cong 1$, errors in the factors $$\sum_{j=1}^{q}\varepsilon_j\gamma_j\left(\frac{P_j}{P'_j}\right)\left(\frac{\xi_j\eta_j}{\xi'^2_j}\right)\sin\varphi_{A_1C_1,j}, \quad (10)$$

$$\sum_{j=1}^{q}\varepsilon_j\gamma_j\left(\frac{P_j}{P'_j}\right)\left(\frac{\xi_j\eta_j}{\xi'^2_j}\right)\cos\varphi_{A_1C_1,j} \quad (11)$$

in the right hand sides of Eqs. (3) and (4), respectively, cancel out in computing the phase $\phi_{A_1C_1}$ from the appropriate ratios of $F_1(S)$ and $F_2(S)$. Thus highly accurate values of the phase $\phi_{A_1C_1}$ corresponding to conjugated quadratures can be measured with first order effects of substrate effects enter in only through some high order effect when operating in a scanning mode.

It is also evident that since the conjugated quadratures of fields are obtained jointly when using the bi-homodyne detection method, there is a significant reduction in the potential for an error in tracking phase as a result of a phase redundancy unlike the situation possible in single-homodyne detection of conjugated quadratures of fields.

The appearance of effects of vibrations and environmental changes is determined by expressing $\phi_{A_1C_1,j}=\phi_{A_1C_1}+\Delta\phi_j$ in Eqs. (3) and (4) where $\Delta\phi$ comprises the effects of vibration, environmental changes, and tilts between reference object 62 and measurement object 60. Eqs. (3) and (4) are rewritten accordingly as $$F_1(S) = \quad (12)$$

$$\sum_{j=1}^{q}\varepsilon_j\frac{S_j}{P'_j\xi'^2_j} = (|A_1|^2+|A_2|^2)\sum_{j=1}^{q}\varepsilon_j\left(\frac{P_j}{P'_j}\right)\left(\frac{\xi_j^2}{\xi'^2_j}\right)+(|B_1|^2+|B_2|^2)$$

$$\sum_{j=1}^{q}\varepsilon_j\left(\frac{P_j}{P'_j}\right)\left(\frac{\xi_j^2}{\xi'^2_j}\right)+(|C_1|^2+|C_2|^2)\sum_{j=1}^{q}\varepsilon_j\left(\frac{P_j}{P'_j}\right)\left(\frac{\eta_j^2}{\eta'^2_j}\right)+$$

$$2|A_1||C_1|\sum_{j=1}^{q}\varepsilon_j^2\left(\frac{P_j}{P'_j}\right)\left(\frac{\xi_j\eta_j}{\xi'^2_j}\right)\begin{pmatrix}\cos\varphi_{A_1C_1} & \cos\Delta\varphi_j \\ -\sin\varphi_{A_1C_1} & \sin\Delta\varphi_j\end{pmatrix}+$$

$$2\left(\frac{|A_2|}{|A_1|}\right)\left(\frac{|C_2|}{|C_1|}\right)|A_1||C_1|$$

$$\sum_{j=1}^{q}\varepsilon_j\gamma_j\left(\frac{P_j}{P'_j}\right)\left(\frac{\xi_j\eta_j}{\xi'^2_j}\right)\begin{pmatrix}\sin\varphi_{A_1C_1} & \cos\Delta\varphi_j \\ +\cos\varphi_{A_1C_1} & \sin\Delta\varphi_j\end{pmatrix}+\ldots,$$

$$F_2(S) = \quad (13)$$

$$\sum_{j=1}^{q}\gamma_j\frac{S_j}{P'_j\xi'^2_j} = (|A_1|^2+|A_2|^2)\sum_{j=1}^{q}\gamma_j\left(\frac{P_j}{P'_j}\right)\left(\frac{\xi_j^2}{\xi'^2_j}\right)+(|B_1|^2+|B_2|^2)$$

$$\sum_{j=1}^{q}\gamma_j\left(\frac{P_j}{P'_j}\right)\left(\frac{\xi_j^2}{\xi'^2_j}\right)+(|C_1|^2+|C_2|^2)\sum_{j=1}^{q}\gamma_j\left(\frac{P_j}{P'_j}\right)\left(\frac{\eta_j^2}{\eta'^2_j}\right)+$$

$$2|A_1||C_1|\sum_{j=1}^{q}\varepsilon_j\gamma_j\left(\frac{P_j}{P'_j}\right)\left(\frac{\xi_j\eta_j}{\xi'^2_j}\right)\begin{pmatrix}\cos\varphi_{A_1C_1} & \cos\Delta\varphi_j \\ -\sin\varphi_{A_1C_1} & \sin\Delta\varphi_j\end{pmatrix}+$$

$$2\left(\frac{|A_2|}{|A_1|}\right)\left(\frac{|C_2|}{|C_1|}\right)|A_1||C_1|$$

$$\sum_{j=1}^{q}\gamma_j^2\left(\frac{P_j}{P'_j}\right)\left(\frac{\xi_j\eta_j}{\xi'^2_j}\right)\begin{pmatrix}\sin\varphi_{A_1C_1} & \cos\Delta\varphi_j \\ +\cos\varphi_{A_1C_1} & \sin\Delta\varphi_j\end{pmatrix}+\ldots,$$

respectively.

Eqs. (12) and (13) are next written in a contracted form as $$F_1(S)=a_{11}\cos\phi_{A_1C_1}+a_{12}\sin\phi_{A_1C_1}+a_1+\ldots, \quad (14)$$

$$F_2(S)=a_{21}\cos\phi_{A_1C_1}+a_{22}\sin\phi_{A_1C_1}+a_2+\ldots, \quad (15)$$

where $$a_{11}=b_{11}+c_{11}, \quad (16)$$

$$a_{12}=b_{12}+c_{12}, \quad (17)$$

$$a_{21}=b_{21}+c_{21}, \quad (18)$$

$$a_{22}=b_{22}+c_{22}, \quad (19)$$

$$a_1=(|A_1|^2+|A_2|^2)\sum_{j=1}^{q}\varepsilon_j\left(\frac{P_j}{P'_j}\right)\left(\frac{\xi_j^2}{\xi'^2_j}\right)+(|B_1|^2+|B_2|^2)+ \quad (20)$$

$$\sum_{j=1}^{q}\varepsilon_j\left(\frac{P_j}{P'_j}\right)\left(\frac{\xi_j^2}{\xi'^2_j}\right)+(|C_1|^2+|C_2|^2)\sum_{j=1}^{q}\varepsilon_j\left(\frac{P_j}{P'_j}\right)\left(\frac{\eta_j^2}{\xi'^2_j}\right),$$

$$a_2=(|A_1|^2+|A_2|^2)\sum_{j=1}^{q}\gamma_j\left(\frac{P_j}{P'_j}\right)\left(\frac{\xi_j^2}{\xi'^2_j}\right)+(|B_1|^2+|B_2|^2)+ \quad (21)$$

$$\sum_{j=1}^{q}\gamma_j\left(\frac{P_j}{P'_j}\right)\left(\frac{\xi_j^2}{\xi'^2_j}\right)+(|C_1|^2+|C_2|^2)\sum_{j=1}^{q}\gamma_j\left(\frac{P_j}{P'_j}\right)\left(\frac{\eta_j^2}{\xi'^2_j}\right),$$

$$b_{11}=2|A_1||C_1|\sum_{j=1}^{q}\varepsilon_j^2\left(\frac{P_j}{P'_j}\right)\left(\frac{\xi_j\eta_j}{\xi'^2_j}\right)\cos\Delta\varphi_j, \quad (22)$$

$$b_{12}=-2|A_1||C_1|\sum_{j=1}^{q}\varepsilon_j^2\left(\frac{P_j}{P'_j}\right)\left(\frac{\xi_j\eta_j}{\xi'^2_j}\right)\sin\Delta\varphi_j, \quad (23)$$

$$b_{21}=2\left(\frac{|A_2|}{|A_1|}\right)\left(\frac{|C_2|}{|C_1|}\right)|A_1||C_1|\sum_{j=1}^{q}\gamma_j^2\left(\frac{P_j}{P'_j}\right)\left(\frac{\xi_j\eta_j}{\xi'^2_j}\right)\sin\Delta\varphi_j, \quad (24)$$

-continued $$b_{22} = 2\left(\frac{|A_2|}{|A_1|}\right)\left(\frac{|C_2|}{|C_1|}\right)|A_1||C_1|\sum_{j=1}^{q}\gamma_j^2\left(\frac{P_j}{P_j'}\right)\left(\frac{\xi_j\eta_j}{\xi_j'^2}\right)\cos\Delta\varphi_j \quad (25)$$

$$c_{11} = 2\left(\frac{|A_2|}{|A_1|}\right)\left(\frac{|C_2|}{|C_1|}\right)|A_1||C_1|\sum_{j=1}^{q}\gamma_j^2\left(\frac{P_j}{P_j'}\right)\left(\frac{\xi_j\eta_j}{\xi_j'^2}\right)\sin\Delta\varphi_j \quad (26)$$

$$c_{12} = 2\left(\frac{|A_2|}{|A_1|}\right)\left(\frac{|C_2|}{|C_1|}\right)|A_1||C_1|\sum_{j=1}^{q}\gamma_j^2\left(\frac{P_j}{P_j'}\right)\left(\frac{\xi_j\eta_j}{\xi_j'^2}\right)\cos\Delta\varphi_j \quad (27)$$

$$c_{21} = 2|A_1||C_1|\sum_{j=1}^{q}\varepsilon_j\gamma_j\left(\frac{P_j}{P_j'}\right)\left(\frac{\xi_j\eta_j}{\xi_j'^2}\right)\cos\Delta\varphi_j, \quad (28)$$

$$c_{22} = -2|A_1||C_1|\sum_{j=1}^{q}\varepsilon_j\gamma_j\left(\frac{P_j}{P_j'}\right)\left(\frac{\xi_j\eta_j}{\xi_j'^2}\right)\sin\Delta\varphi_j, \quad (29)$$

The elements $c_{11}$, $c_{12}$, $c_{21}$, and $c_{22}$ are zero for non-multiple homodyne detection methods and generally non-zero for multiple homodyne detection methods.

The phase $\phi_{A_1C_1}$ of a conjugated quadratures is obtained from the $\sin\phi_{A_1C_1}$ and $\cos\phi_{A_1C_1}$ solutions of the simultaneous Eqs. (14) and (15) as $$\tan\varphi_{A_1C_1} = \frac{a_{11}(F_2-a_2)-a_{21}(F_1-a_1)}{a_{22}(F_1-a_1)-a_{12}(F_2-a_2)}. \quad (30)$$

The error $\delta\phi_{A_1C_1}$ in $\phi_{A_1C_1}$ due to errors $\delta a_1$, $\delta a_2$, $\delta a_{11}$, $\delta a_{12}$, $\delta a_{21}$, and $\delta a_{22}$ in estimated values for $a_1$, $a_2$, $a_{11}$, $a_{12}$, $a_{21}$, and $a_{22}$, respectively, is obtained using the formula $$\delta\phi_{A_1C_1} = -\sin\phi_{A_1C_1}\delta(\cos\phi_{A_1C_1}) + \cos\phi_{A_1C_1}\delta(\sin\phi_{A_1C_1}) \quad (31)$$

which avoids the handling of singularities. The result is $$\delta\varphi_{A_1C_1} = \frac{1}{(a_{11}a_{22}-a_{12}a_{21})}[(F_2-a_2)\delta a_1 - (F_1-a_1)\delta a_2] + \quad (32)$$

$$\frac{1}{2(a_{11}a_{22}-a_{12}a_{21})^2} \times$$

$$\begin{cases}-2(F_1-a_1)(F_2-a_2)(a_{22}\delta a_{11}-a_{21}\delta a_{12}+\\ a_{12}\delta a_{21}-a_{11}\delta a_{22})+\\ [(F_1-a_1)^2+(F_2-a_2)^2](-a_{12}\delta a_{11}+a_{11}\delta a_{12}-\\ a_{22}\delta a_{21}+a_{21}\delta a_{22})-\\ [(F_1-a_1)^2-(F_2-a_2)^2](a_{12}\delta a_{11}-a_{11}\delta a_{12}-\\ a_{22}\delta a_{21}+a_{21}\delta a_{22})\end{cases}.$$

The errors $\delta a_{11}$, $\delta a_{12}$, $\delta a_{21}$, and $\delta a_{22}$ in Eq. (32) are expressed in more fundamental quantities which are errors $\delta b_{11}$, $\delta b_{12}$, $\delta b_{21}$, $\delta b_{22}$, $\delta c_{11}$, $\delta c_{12}$, $\delta c_{21}$, and $\delta c_2$ to obtain the formula $$\delta\varphi_{A_1C_1} = \frac{1}{(a_{11}a_{22}-a_{12}a_{21})}[(F_2-a_2)\delta a_1 - (F_1-a_1)\delta a_2] + \quad (32)$$

-continued
$$\frac{1}{(a_{11}a_{22}-a_{12}a_{21})^2} \times$$

$$\begin{cases}2(F_1-a_1)(F_2-a_2)\begin{bmatrix}(\overline{b}_{11}\delta b_{22}-\overline{b}_{22}\delta b_{11})\\(\overline{b}_{11}\delta c_{22}-\overline{b}_{22}\delta c_{11})\end{bmatrix}+\\ [(F_1-a_1)^2+(F_2-a_2)^2]\begin{bmatrix}(\overline{b}_{11}\delta b_{12}-\overline{b}_{22}\delta b_{21})\\(\overline{b}_{11}\delta c_{12}-\overline{b}_{22}\delta c_{21})\end{bmatrix}+\\ [(F_1-a_1)^2-(F_2-a_2)^2]\begin{bmatrix}(\overline{b}_{11}\delta b_{12}+\overline{b}_{22}\delta b_{21})\\(\overline{b}_{11}\delta c_{12}+\overline{b}_{22}\delta c_{21})\end{bmatrix}\end{cases}+\ldots,$$

where first order terms are shown and $$\overline{b}_{11} = 2|A_1||C_1|\sum_{j=1}^{q}\varepsilon_j^2\left(\frac{P_j}{P_j'}\right)\left(\frac{\xi_j\eta_j}{\xi_j'^2}\right), \quad (34)$$

$$\overline{b}_{22} = 2\left(\frac{|A_2|}{|A_1|}\right)\left(\frac{|C_2|}{|C_1|}\right)|A_1||C_1|\sum_{j=1}^{q}\gamma_j^2\left(\frac{P_j}{P_j'}\right)\left(\frac{\xi_j\eta_j}{\xi_j'^2}\right). \quad (35)$$

The interpretation of Eq. (33) in terms of cyclic errors is helped with the expression of factors $(F_1-a_1)(F_2-a_2)$, $[(F_1-a_1)^2+(F_2-a_2)^2]$, and $[(F_1-a_1)^2-(F_2-a_2)^2]$ in terms of trigonometric functions with arguments proportional to $\phi_{A_1C_1}$:

$$2(F_1-a_1)(F_2-a_2) = (a_{11}a_{22}+a_{12}a_{21})\sin(2\varphi_{A_1C_1}) + \quad (36)$$
$$2a_{11}a_{21}(\cos\varphi_{A_1C_1})^2 + 2a_{22}a_{12}(\cos\varphi_{A_1C_1})^2 + \ldots$$
$$= \overline{b}_{11}\overline{b}_{22}\sin(2\varphi_{A_1C_1}) + \ldots,$$

$$[(F_1-a_1)^2+(F_2-a_2)^2] = (a_{11}^2-a_{21}^2)(\cos\varphi_{A_1C_1})^2 + (a_{22}^2+a_{12}^2) \quad (37)$$
$$(\sin\varphi_{A_1C_1})^2 + (a_{11}a_{12}+a_{22}a_{21}) + \ldots$$
$$= \overline{b}_{11}^2(\cos\varphi_{A_1C_1})^2 + \overline{b}_{22}^2(\sin\varphi_{A_1C_1})^2 + \ldots,$$
$$= \frac{1}{2}(\overline{b}_{11}^2+\overline{b}_{22}^2) + \frac{1}{2}(\overline{b}_{11}^2-\overline{b}_{22}^2)\cos2\varphi_{A_1C_1} + \ldots,$$

$$[(F_1-a_1)^2-(F_2-a_2)^2] = (a_{11}^2-a_{21}^2)(\cos\varphi_{A_1C_1})^2 - (a_{22}^2+a_{12}^2) \quad (38)$$
$$(\sin\varphi_{A_1C_1})^2 +$$
$$(a_{11}a_{12}-a_{22}a_{21})\sin2\varphi_{A_1C_1} +$$
$$= \frac{1}{2}(\overline{b}_{11}^2+\overline{b}_{22}^2)\cos2\varphi_{A_1C_1} + \frac{1}{2}(\overline{b}_{11}^2-\overline{b}_{22}^2) + \ldots.$$

Interpretation of Effects of Vibrations and Environmental Changes as Cyclic Errors It is evident from Eq. (36) that the leading term with the factor $2(F_1-a_1)(F_2-a_2)$ is $\overline{b}_{11}\overline{b}_{22}\sin2\phi_{A_1C_1}$, from Eq. (37) that the leading term with the factor $[(F_1-a_1)^2+(F_2-a_2)^2]$ is $(\overline{b}_{11}^2+\overline{b}_{22}^2)/2$, and from Eq. (38) that the leading term with the factor $[(F_1-a_1)^2-(F_2-a_2)^2]$ is $[(\overline{b}_{11}^2+\overline{b}_{22}^2)/2]\cos2\phi_{A_1C_1}$. Accordingly with reference to Eq. (33), the effects of vibrations and environmental changes are present in the form of cyclic errors at zero spatial frequency and as conjugated quadratures at the second harmonic of phase $\phi_{A_1C_1}$. Note that cyclic errors also appear as conjugated quadratures at the first harmonic of phase $\phi_{A_1C_1}$ generated by errors $a_1$ and $a_2$ which are determined by errors in the selection of values of and $\xi'_j$ and $P'_j$ [see Eqs. (20) and (21)].

The transformation of the effects of vibrations and environmental changes and the effects of errors in the selection of values of $\xi'_j$ and $P'_j$ into cyclic errors that are represented as harmonics of phase $\phi_{A_1C_1}$ represents a significant advantage of the use of the detection methods described herein with respect to understanding, reducing, and compensating the effects of vibrations and environmental changes.

Cyclic Errors are Reduced by Operating in the Reference Frame

The cyclic error that appears as a zeroth harmonic of $\phi_{A_1C_1}$ represents a fixed offset in $\phi_{A_1C_1}$ and as such does not present a problem in wavefront interferometry. The fixed offset in $\phi_{A_1C_1}$ corresponds to a piston type of optical aberration. The amplitudes of the cyclic errors that appear as components of conjugated quadratures at the second harmonic of $\phi_{A_1C_1}$ are determined by properties of the vibrations and environmental changes present during the acquisition of the corresponding electrical signal values. These amplitudes of the cyclic errors are reduced in the first embodiment of the present invention by operating in the reference frame where the optical path length of the cavity formed by the reference and measurement objects is maintained at or near a constant value mod $2\pi$ through the control of the reference frequency $f_R$.

The electrical interference signal 172 is processed for changes of one of the components of the corresponding conjugated quadratures and the measured changes of one of the components is used by electronic processor and controller 80 as an error signal to control the reference frequency of source 18.

The maintenance of optical path length of the cavity at or near a constant value mod $2\pi$ may alternatively be achieved by a combination of controlling with the error signal the reference frequency of source 18 and the relative physical length of the cavity by transducers 150 and 152 (see FIG. 1b). Transducers 150 and 152 which generally have a slower frequency response than that of source 18 may be beneficially used to extend the range over which the reference frequency may be controlled.

The contributions of changes in relative orientation due to vibrations and environmental changes of the reference and measurement objects that are detected by processing electrical interference signal 172 by electronic processor and controller 80 are used by electronic processor and controller 80 to generate corresponding error signals. The corresponding error signals may be used by electronic processor and controller 80 to control the relative orientation of reference and measurement objects 62 and 60 by transducers 150 and 152.

The contributions of changes in relative deformation due to vibrations and environmental changes of the reference and measurement objects that are detected by processing electrical interference signal 172 by electronic processor and controller 80 are used by electronic processor and controller 80 to generate other corresponding error signals. The other corresponding error signals may be used by electronic processor and controller 80 to control the relative deformation of reference and measurement objects 62 and 60 by transducers 150 and 152 augmented to introduce torques to reference object 62. Additional transducers other than augmented transducers 150 and 152 may be used beneficially in end use applications.

A primary advantage of operating in the reference frame is that the linearity and calibration of source 18 and of transducers 150 and 152 is not an issue since the reference frame is maintained by an active servo control system. The linearity and calibration of transducers generally are an issue in prior art wavefront interferometry.

Another advantage is that the error signals that are detected by processing electrical interference signal 172 by electronic processor and controller 80 can be monitored whether or not used as error signals in the control of the properties of the cavity and used to limit the amplitude of cyclic errors. The amplitudes of the cyclic errors are computed on-line as a function of time by electronic processor and controller 80 using Eqs. (22), (23), (24), (25), (26), and (27). When one or more computed amplitudes of cyclic errors reach respective preset values, shutter 168 is closed. Thus the length of the window corresponding the integration period used by detector 70 is controlled by shutter 168 to limit the amplitudes of cyclic errors so as to not exceed the preset values.

Compensation for the Cyclic Errors Based on Measured Changes in Properties of Cavity The compensation of effects of the cyclic errors generated by effects of vibrations and environmental changes and the effects of errors in the selection of values of $\xi'_j$ may be addressed in several different ways: the effects reduced by operating in the reference frame without any subsequent compensation; the effects reduced by operating in the reference frame and the residual effects of the cyclic errors generated by effects of vibrations and environmental changes, the residual effects of vibrations and environmental changes measured as changes in properties of the cavity, the amplitudes of the corresponding cyclic errors computed from the measured residual effects, and the computed amplitudes of cyclic errors used to compensate for the effects of cyclic errors; and the amplitudes of the cyclic errors due to the effects measured and the measured amplitudes of the cyclic errors used to compensate for the effects of cyclic errors.

The contributions of the residual effects of vibrations and environmental changes that are present when operating in the reference frame are detected and measured by processing electrical interference signal 172 by electronic processor and controller 80. The measured residual effects are used by electronic processor and controller 80 to compute the amplitudes of respective cyclic errors using Eqs. (22), (23), (24), (25), (26), and (27). The computed amplitudes of respective cyclic errors are subsequently used to compensate for the effects of cyclic errors.

Compensation for the Cyclic Errors Based on Measured Amplitudes of Cyclic Errors The amplitudes of the cyclic errors are measured by the introduction of a tilt in the relative wavefronts of the reference and measurement beams. The cyclic errors are measured as first and second harmonics of the contribution to phase $\phi_{A_1C_1}$ by the tilt. The measured amplitudes of the cyclic errors are subsequently used to compensate for the effects of the cyclic errors.

The measurement of the amplitudes of the cyclic errors may be repeated for several different tilts in order to compensate for the effects of a relative periodic surface structure of the reference and measurement objects that accidentally coincided with the spatial frequency introduced by a particular tilt value and orientation.

From Eq. (33), we have for the error in phase the equation $$\delta\varphi_{A_1C_1} = \frac{1}{(a_{11}a_{22} - a_{12}a_{21})}[\overline{b}_{22}\delta a_1 \sin\varphi_{A_1C_1} - \overline{b}_{11}\delta a_2 \cos\varphi_{A_1C_1}] + \quad (39)$$

-continued $$\frac{1}{4(a_{11}a_{22} - a_{12}a_{21})^2} \times$$

$$\left\{ \begin{array}{l} 2(\overline{b}_{22}\delta b_{11} - \overline{b}_{11}\delta b_{22}) + \overline{b}_{11}\overline{b}_{22}\sin 2\varphi_{A_1C_1} - \\ (\overline{b}_{22}\delta b_{21} - \overline{b}_{11}\delta b_{12})[(\overline{b}_{11}^2 + \overline{b}_{22}^2) + (\overline{b}_{11}^2 - \overline{b}_{22}^2)] \\ \cos 2\varphi_{A_1C_1}] + (\overline{b}_{22}\delta b_{21} + \overline{b}_{11}\delta b_{12}) \\ [(\overline{b}_{11}^2 + \overline{b}_{22}^2)\cos 2\varphi_{A_1C_1} + (\overline{b}_{11}^2 - \overline{b}_{22}^2)] \end{array} \right\} +$$

$$\frac{1}{4(a_{11}a_{22} - a_{12}a_{21})^2} \times$$

$$\left\{ \begin{array}{l} 2(\overline{b}_{22}\delta b_{11} - \overline{b}_{11}\delta b_{22}) + \overline{b}_{11}\overline{b}_{22}\sin 2\varphi_{A_1C_1} - \\ (\overline{b}_{22}\delta b_{21} - \overline{b}_{11}\delta b_{12})[(\overline{b}_{11}^2 + \overline{b}_{22}^2) + (\overline{b}_{11}^2 - \overline{b}_{22}^2)] \\ \cos 2\varphi_{A_1C_1}] + (\overline{b}_{22}\delta b_{21} + \overline{b}_{11}\delta b_{12}) \\ [(\overline{b}_{11}^2 + \overline{b}_{22}^2)\cos 2\varphi_{A_1C_1} + (\overline{b}_{11}^2 - \overline{b}_{22}^2)] \end{array} \right\} + \dots$$

Eq. (39) reduces to the following equation where terms representing first order effects are shown.

$$\delta\varphi_{A_1C_1} = \frac{1}{\overline{b}_{11}\overline{b}_{22}}(\overline{b}_{22}\delta a_1 \sin\varphi_{A_1C_1} - \overline{b}_{11}\delta a_2 \cos\varphi_{A_1C_1}) + \quad (40)$$

$$\frac{1}{4(\overline{b}_{11}\overline{b}_{22})^2} \times \left[ \begin{array}{l} 2(\overline{b}_{22}\delta b_{11} - \overline{b}_{11}\delta b_{22})\overline{b}_{11}\overline{b}_{22}\sin 2\varphi_{A_1C_1} - \\ (\overline{b}_{22}\delta b_{21} - \overline{b}_{11}\delta b_{12})(\overline{b}_{11}^2 + \overline{b}_{22}^2) + \\ (\overline{b}_{22}\delta b_{21} + \overline{b}_{11}\delta b_{12})(\overline{b}_{11}^2 + \overline{b}_{22}^2)\cos 2\varphi_{A_1C_1} \end{array} \right] +$$

$$\frac{1}{4(\overline{b}_{11}\overline{b}_{22})^2} \times \left[ \begin{array}{l} 2(\overline{b}_{22}\delta b_{11} - \overline{b}_{11}\delta b_{22})\overline{b}_{11}\overline{b}_{22}\sin 2\varphi_{A_1C_1} - \\ (\overline{b}_{22}\delta b_{21} - \overline{b}_{11}\delta b_{12})(\overline{b}_{11}^2 + \overline{b}_{22}^2) + \\ (\overline{b}_{22}\delta b_{21} + \overline{b}_{11}\delta b_{12})(\overline{b}_{11}^2 + \overline{b}_{22}^2)\cos 2\varphi_{A_1C_1} \end{array} \right] + \dots$$

Single-Homodyne Detection Methods

For the single-homodyne detection methods where an electrical interference signal value contains information about a single component of a conjugated quadratures, the product $\epsilon_j \gamma_j = 0$ (see Tables 2 and 3). As a consequence, $$c_{ij} = 0 \quad (41)$$

[see Eqs. (26), (27), (28), and (29)] and Eq. (40) reduces to the expression $$\delta\varphi_{A_1C_1} = \frac{1}{\overline{b}_{11}\overline{b}_{22}}(\overline{b}_{22}\delta a_1 \sin\varphi_{A_1C_1} - \overline{b}_{11}\delta a_2 \cos\varphi_{A_1C_1}) + \quad (42)$$

$$\frac{1}{4(\overline{b}_{11}\overline{b}_{22})^2} \times \left[ \begin{array}{l} 2(\overline{b}_{22}\delta b_{11} - \overline{b}_{11}\delta b_{22})\overline{b}_{11}\overline{b}_{22}\sin 2\varphi_{A_1C_1} - \\ (\overline{b}_{22}\delta b_{21} - \overline{b}_{11}\delta b_{12})(\overline{b}_{11}^2 + \overline{b}_{22}^2) + \\ (\overline{b}_{22}\delta b_{21} + \overline{b}_{11}\delta b_{12})(\overline{b}_{11}^2 + \overline{b}_{22}^2)\cos 2\varphi_{A_1C_1} \end{array} \right] + \dots$$

Note that the cyclic error at zero spatial frequency corresponds to a constant offset in $\phi_{A_1C_1}$ or a piston type of optical aberration that is unimportant in determining properties of the differences in reference and measurement beam wavefronts. However, that offset can be used in certain cases as an error signal for reducing the effects of vibrations and environmental changes as will be described.

The phase shifting algorithm corresponding to $\epsilon_j$ and $\gamma_j$ values listed in Table 2 as a Schedule 1 corresponds to the algorithm based on the standard set of four phase shift values of 0, $\pi/2$, $\pi$, and $3\pi/2$. The corresponding single-homodyne detection method exhibits according to Eq. (42) a first order sensitivity to effects of vibrations and environmental changes with a peak in sensitivity at a zero frequency value for components of the Fourier spectrum of effects of vibrations and environmental changes. For a constant rate of change of the optical path length, $\delta b_{21} = \delta b_{12}$ and $\delta b_{12}$ is proportional to the constant rate of change [see Eqs. (23) and (24)].

A set of values of $\epsilon_j$ and $\gamma_j$ corresponding to a second set of phase shifts 0, $\pi/2$, $-\pi/2$, and $\pm\pi$ is listed in Table 3 as Schedule 2 for a single-homodyne detection method. The algorithm based on the first set of phase shift values listed in Table 3 exhibits according to Eq. (42) only a second order sensitivity to effects of vibrations and environmental changes with a peak in sensitivity at a non-zero frequency value for components of the Fourier spectrum of effects of vibrations and environmental changes. For a constant rate of change of the optical path length, $\delta b_{21} = \delta b_{12} = 0$ [see Eqs. (23) and (24)]. As a consequence, the effects of vibrations and environmental changes contribute to the factor $\overline{b}_{22}\delta b_{21} + \overline{b}_{11}\delta b_{12}$ in Eq. (42) only through second and higher order effects. Because of the properties of $\delta b_{11}$ and $\delta b_{22}$ as exhibited in Eqs. (25) and (26), the effects of vibrations and environmental changes contribute to the factor $(\overline{b}_{22}\delta b_{11} - \overline{b}_{11}\delta b_{22})$ in Eq. (42) through second and higher order effects.

Thus an advantage of the single-homodyne detection method based on the values of $\epsilon_j$ and $\gamma_j$ corresponding to the second set of phase shifts 0, $\pi/2$, $-\pi/2$, and $\pm\pi$ listed in Table 3 is an intrinsic reduced sensitivity to effects of vibrations and environmental changes.

Bi-Homodyne Detection Methods

Table 4 lists as Schedule 3 a set of values for $\epsilon_j$ and $\gamma_j$ for a bi-homodyne detection method that corresponds to the standard set of phase shifts 0, $\pi/2$, $\pi$, and $3\pi/2$ which is the same as Table 1 in referenced U.S. patent application Ser. No. 10/765,368 (ZI-47). The bi-homodyne detection method using the set of values of $\epsilon_j$ and $\gamma_j$ listed in Table 4 exhibits according to Eq. (40) a first order sensitivity to effects of vibration and environmental changes with a peak in sensitivity at a zero frequency value for components of the Fourier spectrum of effects of vibrations and environmental changes.

For a constant rate of change of the optical path length, $\delta b_{21} = \delta b_{12} = 0$ [see Eqs. (23) and (24)]. As a consequence, the effects of vibrations and environmental changes contribute to the factor $\overline{b}_{22}\delta b_{21} + \overline{b}_{11}\delta b_{12}$ in Eq. (40) only through second and higher order effects. Because of the properties of $\delta b_{11}$ and $\delta b_{22}$ as exhibited in Eqs. (25) and (26), the effects of vibrations and environmental changes contribute to the factor $(\overline{b}_{22}\delta b_{11} - \overline{b}_{11}\delta b_{22})$ in Eq. (42) through second and higher order effects.

Also for a constant rate of change of the optical path length, $\delta c_{21} = \delta c_{12} = 0$ [see Eqs. (27) and (28)]. As a consequence, the effects of vibrations and environmental changes contribute to the factor $\overline{b}_{22}\delta c_{21} + \overline{b}_{11}\delta c_{12}$ in Eq. (40) only through second and higher order effects.

However, $\delta c_{21} = -\delta c_{12}$ and $\delta c_{12}$ is proportional the constant rate of change of the optical path length [see Eqs. (26) and (29)]. As a consequence, the factor $(\overline{b}_{22}\delta c_{11} - \overline{b}_{11}\delta c_{22})$ in Eq. (40) has a first order sensitivity to a constant rate of change of the optical path length.

There are disclosed herein sets of values of $\epsilon_j$ and $\gamma_j$, an example of which is listed in Table 5 as schedule 4, for a bi-homodyne detection method that exhibits according to Eq. (40) for a sequence of q phase shift values where q=4, 8, ... a second order sensitivity to effects of vibrations and environmental changes with a peak in sensitivity at a non-zero frequency value for components of the Fourier spectrum of effects of vibrations and environmental changes. The properties of the bi-homodyne detection methods with respect to whether there is a second order sensitivity to effects of vibrations and environmental changes is determined by the symmetry properties of $\epsilon_j \gamma_j$ about the value of j, i.e., $j=(q+1)/2$.

For a constant rate of change of the optical path length, $\delta b_{21} = \delta b_{12} = 0$ [see Eqs. (23) and (24)]. As a consequence, the effects of vibrations and environmental changes contribute to the factor $\bar{b}_{22} \delta b_{21} + \bar{b}_{11} \delta b_{12}$ in Eq. (40) only through second and higher order effects. Because of the properties of $\delta b_{11}$ and $\delta b_{22}$ as exhibited in Eqs. (25) and (26), the effects of vibrations and environmental changes contribute to the factor $(\bar{b}_{22} \delta b_{11} - \bar{b}_{11} \delta b_{22})$ in Eq. (42) through second and higher order effects.

In addition for a constant rate of change of the optical path length, $\delta c_{21} = \delta c_{12} = 0$ [see Eqs. (27) and (28)]. As a consequence, the effects of vibrations and environmental changes contribute to the factor $\bar{b}_{22} \delta c_{21} + \bar{b}_{11} \delta c_{12}$ in Eq. (40) only through second and higher order effects.

However, $\delta c_{11} = \delta c_{22} = 0$ for the constant rate of change of the optical path length [see Eqs. (26) and (29)]. As a consequence, the effects of vibrations and environmental changes contribute to the factor $(\bar{b}_{22} \delta c_{11} - \bar{b}_{11} \delta c_{22})$ in Eq. (40) only through second and higher order effects.

Thus an advantage of the bi-homodyne detection method based on the values of $\epsilon_j$ and $\gamma_j$ listed in Table 5 is an intrinsic reduced sensitivity to effects of vibrations and environmental changes.

In summary, the single homodyne set of $\epsilon_j$ and $\gamma_j$ given in Table 2 and the bi-homodyne set of $\epsilon_j$ and $\gamma_j$ given in Table 4 lead to first order sensitivities of respective measured conjugated quadratures to vibrations and environmental changes with a peak in sensitivity at a zero frequency value for components of the Fourier spectrum of effects of vibrations and environmental changes. In contrast, the single-homodyne set of $\epsilon_j$ and $\gamma_j$ given in Table 3 and the bi-homodyne set of $\epsilon_j$ and $\gamma_j$ given in Table 5 lead for values of q=4 and 8 to second and higher order sensitivities of respective measured conjugated quadratures to effects of vibrations and environmental changes with a peak in sensitivity at a non-zero frequency value for components of the Fourier spectrum of effects of vibrations and environmental changes approximately zero frequencies.

There are a number of advantages of the bi-homodyne detection method as a consequence of the conjugated quadratures of fields being jointly acquired quantities. One advantage is a reduced sensitivity the effects of an overlay error of a spot in or on the substrate that is being imaged and a conjugate image of conjugate pixel of a multipixel detector during the acquisition of four electrical interference signal values of each spot in and/or on a substrate imaged using interferometric far-field and/or near-field confocal and non-confocal microscopy. Overlay errors are errors in the set of four conjugate images of a respective set of conjugate detector pixels relative to the spot being imaged.

Another advantage is that when operating in the scanning mode there is a reduced sensitivity to effects of pinhole-to-pinhole variations in properties of a conjugate set of pinholes used in a confocal microscopy system that are conjugate to a spot in or on the substrate being imaged at different times during the scan.

Another advantage is that when operating in the scanning mode there is a reduced sensitivity to effects of pixel-to-pixel variation of properties within a set of conjugate pixels that are conjugate to a spot in or on the substrate being imaged at different times during the scan.

Another advantage is that when operating in the scanning mode there is reduced sensitivity to effects of pulse sequence to pulse sequence variations of a respective conjugate set of pulse sequences of the input beam 24 to the interferometer system.

The pinholes and pixels of a multipixel detector of a set of conjugate pinholes and conjugate pixels of a multipixel detector may comprise contiguous pinholes of an array of pinholes and/or contiguous pixels of a multipixel detector or may comprise selected pinholes from an array of pinholes and/or pixels from an array of pixels wherein the separation between the selected pinholes is an integer number of pinhole spacings and the separation between an array of respective pixels corresponds to an integer number of pixel spacings without loss of lateral and/or longitudinal resolution and signal-to-noise ratios. The corresponding scan rate would be equal to the integer times the spacing of spots on the measurement object 60 conjugate to set of conjugate pinholes and/or set of conjugate pixels divided by the read out rate of the multipixel detector. This property permits a significant increase in throughput for an interferometric far-field or near-field confocal or non-confocal microscope with respect to the number of spots in and/or on a substrate imaged per unit time.

Referring to the quad-homodyne detection method used in various embodiments of the present invention, a set of electrical interference signal values is obtained for each spot on and/or in substrate 60 being imaged. The properties of the quad-homodyne detection method with respect to effects of vibration and environmental changes are developed herein for the case of q equal to 4 in order to display the features relating to effects of vibration and environmental changes without departing from the scope and spirit of the present invention. The results for q equal to 4 can easily be extended to the cases of q equal to 8, 12, . . . . The corresponding set of electrical interference signal values $S_j$ for q equal to 4 used for obtaining conjugated quadratures of fields for a single a spot on and/or in a substrate being imaged is represented for the quad-homodyne detection within a scale factor by the formulae $$S_1 = P_1 \begin{Bmatrix} \xi_1^2 |A_1|^2 + \zeta_1^2 |B_1|^2 + \eta_1^2 |C_1|^2 + \zeta_1 \eta_1 2 |B_1||C_1| \cos\varphi_{B_1 C_1 \varepsilon_1} + \\ \xi_1 \zeta_1 2 |A_1||B_1| \cos\varphi_{A_1 B_1 \varepsilon_1} + \varepsilon_1 \xi_1 \eta_1 2 |A_1||C_1| \cos\varphi_{A_1 C_1, 1} + \\ \xi_1^2 |A_2|^2 + \zeta_1^2 |B_2|^2 + \eta_1^2 |C_2|^2 + \zeta_1 \eta_1 2 |B_2||C_2| \cos\varphi_{B_2 C_2 \gamma_1} + \\ \xi_1 \zeta_1 2 |A_2||B_2| \cos\varphi_{A_2 B_2 \gamma_1} + \gamma_1 \xi_1 \eta_1 2 |A_2||C_2| \cos\varphi_{A_2 C_2, 1} \end{Bmatrix} \quad (43)$$

$$S_2 = P_1 \begin{Bmatrix} \xi_2^2 |A_3|^2 + \zeta_2^2 |B_3|^2 + \eta_2^2 |C_3|^2 + \zeta_2 \eta_2 2 |B_3||C_3| \cos\varphi_{B_3 C_3 \varepsilon_2} + \\ \xi_2 \zeta_2 2 |A_3||B_3| \cos\varphi_{A_3 B_3 \varepsilon_2} + \varepsilon_2 \xi_2 \eta_2 2 |A_3||C_3| \cos\varphi_{A_3 C_3, 2} + \\ \xi_2^2 |A_4|^2 + \zeta_2^2 |B_4|^2 + \eta_2^2 |C_4|^2 + \zeta_2 \eta_2 2 |B_4||C_4| \cos\varphi_{B_4 C_4 \gamma_2} + \\ \xi_2 \zeta_2 2 |A_4||B_4| \cos\varphi_{A_4 B_4 \gamma_2} + \gamma_2 \xi_2 \eta_2 2 |A_4||C_4| \cos\varphi_{A_4 C_4, 2} \end{Bmatrix} \quad (44)$$

$$S_3 = P_2 \begin{Bmatrix} \xi_1^2 |A_1|^2 + \zeta_1^2 |B_1|^2 + \eta_1^2 |C_1|^2 + \zeta_1 \eta_1 2 |B_1||C_1| \cos\varphi_{B_1 C_1 \varepsilon_3} + \\ \xi_1 \zeta_1 2 |A_1||B_1| \cos\varphi_{A_1 B_1 \varepsilon_3} + \varepsilon_3 \xi_1 \eta_1 2 |A_1||C_1| \cos\varphi_{A_1 C_1, 3} + \\ \xi_1^2 |A_2|^2 + \zeta_1^2 |B_2|^2 + \eta_1^2 |C_2|^2 + \zeta_1 \eta_1 2 |B_2||C_2| \cos\varphi_{B_2 C_2 \gamma_3} + \\ \xi_1 \zeta_1 2 |A_2||B_2| \cos\varphi_{A_2 B_2 \gamma_3} + \gamma_3 \xi_1 \eta_1 2 |A_2||C_2| \cos\varphi_{A_2 C_2, 3} \end{Bmatrix} \quad (45)$$

$$S_4 = P_2 \begin{Bmatrix} \xi_2^2 |A_3|^2 + \zeta_2^2 |B_3|^2 + \eta_2^2 |C_3|^2 + \zeta_2 \eta_2 2 |B_3||C_3| \cos\varphi_{B_3 C_3 \varepsilon_4} + \\ \xi_2 \zeta_2 2 |A_3||B_3| \cos\varphi_{A_3 B_3 \varepsilon_4} + \varepsilon_2 \xi_2 \eta_2 2 |A_3||C_3| \cos\varphi_{A_3 C_3, 4} + \\ \xi_2^2 |A_4|^2 + \zeta_2^2 |B_4|^2 + \eta_2^2 |C_4|^2 + \zeta_2 \eta_2 2 |B_4||C_4| \cos\varphi_{B_4 C_4 \gamma_4} + \\ \xi_2 \zeta_2 2 |A_4||B_4| \cos\varphi_{A_4 B_4 \gamma_4} + \gamma_2 \xi_2 \eta_2 2 |A_4||C_4| \cos\varphi_{A_4 C_4, 4} \end{Bmatrix} \quad (46)$$

where coefficients $A_1$, $A_2$, $A_3$, and $A_4$ represent the amplitudes of the reference beams corresponding to the first, second, third, and fourth frequency components, respectively, of input beam 24; coefficients $B_1$, $B_2$, $B_3$, and $B_4$ represent the amplitudes of background beams corresponding to reference beams $A_1$, $A_2$, $A_3$, and $A_4$, respectively; coefficients $C_1$, $C_2$, $C_3$, and $C_4$ represent the amplitudes of the return measurement beams corresponding to reference beams $A_1$, $A_2$, $A_3$, and $A_4$, respectively; $P_1$ and $P_2$ represent the integrated intensities of the first frequency component in the first and second windows, respectively, of the input beam 24; and the values for $\epsilon_j$ and $\gamma_j$ are listed in Tables 4 and 5. The description of the coefficients $\xi_j$, $\zeta_j$, and $\eta_j$ for the quad-homodyne detection method is the same as the corresponding portion of the description given for $\xi_j$, $\zeta_j$, and $\eta_j$ of the bi-homodyne detection method.

It is assumed in Eqs. (43), (44), (45), and (46) that the ratios of $|A_2|/|A_1|$ and $|A_4|/|A_3|$ are not dependent on $j$ or the value of $P_j$. In order to simplify the representation of $S_j$ so as to project the important features without departing from either the scope or spirit of the present invention, it is also assumed in Eqs. (43), (44), (45), and (46) that the ratios of the amplitudes of the return measurement beams corresponding to $|A_2|/|A_1|$ and $|A_4|/|A_3|$ are not dependent on $j$ or the value of $P_j$. However, the ratios $|C_2|/|C_1|$ and $|C_4|/|C_3|$ will be different from the ratios $|A_2|/|A_1|$ and $|A_4|/|A_3|$, respectively, when the ratio of the amplitudes of the measurement beam components corresponding to $|A_2|/|A_1|$ and $|A_4|/|A_3|$, respectively, are different from the ratios $|A_2|/|A_1|$ and $|A_4|/|A_3|$, respectively.

Noting that $\cos\phi_{A_2C_2,j} = \pm\sin\phi_{A_1C_1,j}$ by the control of the relative phase shifts between corresponding reference and measurement beam components in beam 32, Eqs. (43), (44), (45), and (46) may be written, respectively, as $$S_1 = P_1\left\{\begin{array}{l} \xi_1^2(|A_1|^2+|A_2|^2)+\zeta_1^2(|B_1|^2+|B_2|^2)+\eta_1^2(|C_1|^2+|C_2|^2)+ \\ 2\zeta_1\eta_1[|B_1||C_1|\cos\varphi_{B_1C_1\varepsilon_1}+|B_2||C_2|\cos\varphi_{B_2C_2\gamma_1}]+ \\ 2\xi_1\eta_1\left[\begin{array}{l}\varepsilon_1|A_1||C_1|\cos\varphi_{A_1C_1,1}+\gamma_1\left(\frac{|A_2|}{|A_1|}\right) \\ +\left(\frac{|C_1|}{|C_2|}\right)|A_1||C_1|\sin\varphi_{A_1C_1,1}\end{array}\right]+ \\ 2\xi_1\zeta_1[|A_1||B_1|\cos\varphi_{A_1B_1\varepsilon_1}+|A_2||B_2|\cos\varphi_{A_2B_2\gamma_1}] \end{array}\right\}, \quad (47)$$

$$S_2 = P_1\left\{\begin{array}{l} \xi_2^2(|A_3|^2+|A_4|^2)+\zeta_2^2(|B_3|^2+|B_4|^2)+\eta_2^2(|C_3|^2+|C_4|^2)+ \\ 2\zeta_2\eta_2[|B_3||C_3|\cos\varphi_{B_3C_3\varepsilon_2}+|B_4||C_4|\cos\varphi_{B_4C_4\gamma_2}]+ \\ 2\xi_2\eta_2\left(\frac{|A_3|}{|A_1|}\right)\left(\frac{|C_3|}{|C_1|}\right)\left[\begin{array}{l}\varepsilon_2|A_1||C_1|\cos\varphi_{A_1C_1,2}+\gamma_2\left(\frac{|A_4|}{|A_3|}\right) \\ +\left(\frac{|C_4|}{|C_3|}\right)|A_1||C_1|\sin\varphi_{A_1C_1,2}\end{array}\right]+ \\ 2\xi_2\zeta_2[|A_3||B_3|\cos\varphi_{A_3B_3\varepsilon_2}+|A_4||B_4|\cos\varphi_{A_4B_4\gamma_2}] \end{array}\right\}, \quad (48)$$

$$S_3 = P_2\left\{\begin{array}{l} \xi_1^2(|A_1|^2+|A_2|^2)+\zeta_1^2(|B_1|^2+|B_2|^2)+\eta_1^2(|C_1|^2+|C_2|^2)+ \\ 2\zeta_1\eta_1[|B_1||C_1|\cos\varphi_{B_1C_1\varepsilon_3}+|B_2||C_2|\cos\varphi_{B_2C_2\gamma_3}]+ \\ 2\xi_1\eta_1\left[\begin{array}{l}\varepsilon_3|A_1||C_1|\cos\varphi_{A_1C_1,3}+\gamma_3\left(\frac{|A_2|}{|A_1|}\right) \\ +\left(\frac{|C_1|}{|C_2|}\right)|A_1||C_1|\sin\varphi_{A_1C_1,3}\end{array}\right]+ \\ 2\xi_1\zeta_1[|A_1||B_1|\cos\varphi_{A_1B_1\varepsilon_3}+|A_2||B_2|\cos\varphi_{A_2B_2\gamma_3}] \end{array}\right\}, \quad (49)$$

$$S_4 = P_2\left\{\begin{array}{l} \xi_2^2(|A_3|^2+|A_4|^2)+\zeta_2^2(|B_3|^2+|B_4|^2)+\eta_2^2(|C_3|^2+|C_4|^2)+ \\ 2\zeta_2\eta_2[|B_3||C_3|\cos\varphi_{B_3C_3\varepsilon_4}+|B_4||C_4|\cos\varphi_{B_4C_4\gamma_4}]+ \\ 2\xi_2\eta_2\left(\frac{|A_3|}{|A_1|}\right)\left(\frac{|C_3|}{|C_1|}\right)\left[\begin{array}{l}\varepsilon_4|A_1||C_1|\cos\varphi_{A_1C_1,4}+\gamma_4\left(\frac{|A_4|}{|A_3|}\right) \\ +\left(\frac{|C_4|}{|C_3|}\right)|A_1||C_1|\sin\varphi_{A_1C_1,4}\end{array}\right]+ \\ 2\xi_2\zeta_2[|A_3||B_3|\cos\varphi_{A_3B_3\varepsilon_4}+|A_4||B_4|\cos\varphi_{A_4B_4\gamma_4}] \end{array}\right\}, \quad (50)$$

where the relationships $\cos\phi_{A_3C_3,j} = \cos\phi_{A_1C_1,j}$, $\cos\phi_{A_4C_4,j} = \cos\phi_{A_2C_2,j}$, and $\cos\phi_{A_2C_2,j} = \sin\phi_{A_1C_1,j}$ have been used without departing from either the scope or spirit of the present invention.

Information about the conjugated quadratures $|C_1|\cos\phi_{A_1C_1,j}$ and $|C_1|\sin\phi_{A_1C_1,j}$ are obtained using the symmetric and antisymmetric properties and orthogonality property of the conjugated quadratures as represented by the following digital filters applied to the signal values $S_j$: $j = 1, 2, 3, 4$ $$F_3(S) = \left(\frac{1}{P_1'}\right)\left(\frac{S_1}{\xi_1'^2} - \frac{S_2}{\xi_2'^2}\right) - \left(\frac{1}{P_2'}\right)\left(\frac{S_3}{\xi_1'^2} - \frac{S_4}{\xi_2'^2}\right), \quad (51)$$

$$F_4(S) = \left(\frac{1}{P_1'}\right)\left(\frac{S_1}{\xi_1'^2} - \frac{S_2}{\xi_2'^2}\right) + \left(\frac{1}{P_2'}\right)\left(\frac{S_3}{\xi_1'^2} - \frac{S_4}{\xi_2'^2}\right). \quad (52)$$

The description of $\xi'_j$ and $P'_j$ for the quad-homodyne detection method is the same as the corresponding description given for $\xi'_j$ and $P'_j$ in the bi-homodyne detection method. Using Eqs. (47), (48), (49), (50), (51), and (52), the following expressions are obtained for the filtered quantities containing components of the conjugated quadratures $|C_1|\cos\phi_{A_1C_1,j}$ and $|C_1|\sin\phi_{A_1C_1,j}$:

$$F_3(S) = 2|A_1||C_1|\times\left\{\begin{array}{l}\frac{P_1}{P_1'}\left[\left(\frac{\xi_1\eta_1}{\xi_1'^2}\right)\cos\varphi_{A_1C_1,1}+ \right. \\ \left(\frac{\xi_2\eta_2}{\xi_2'^2}\right)\left(\frac{|A_3|}{|A_1|}\right)\left(\frac{|C_3|}{|C_1|}\right)\cos\varphi_{A_1C_1,2}\right]+ \\ \frac{P_2}{P_2'}\left[\left(\frac{\xi_1\eta_1}{\xi_1'^2}\right)\cos\varphi_{A_1C_1,3}+ \right. \\ \left.\left(\frac{\xi_2\eta_2}{\xi_2'^2}\right)\left(\frac{|A_3|}{|A_1|}\right)\left(\frac{|C_3|}{|C_1|}\right)\cos\varphi_{A_1C_1,4}\right]\end{array}\right\}+ \quad (53)$$

$$2\left(\frac{|A_2|}{|A_1|}\right)\left(\frac{|C_2|}{|C_1|}\right)|A_1||C_1|\times\left\{\begin{array}{l}\frac{P_1}{P_1'}\left[\left(\frac{\xi_1\eta_1}{\xi_1'^2}\right)\sin\varphi_{A_1C_1,1}+ \right. \\ \left(\frac{\xi_2\eta_2}{\xi_2'^2}\right)\left(\frac{|A_4|}{|A_2|}\right)\left(\frac{|C_4|}{|C_2|}\right)\sin\varphi_{A_1C_1,2}\right]- \\ \frac{P_2}{P_2'}\left[\left(\frac{\xi_1\eta_1}{\xi_1'^2}\right)\sin\varphi_{A_1C_1,3}+ \right. \\ \left.\left(\frac{\xi_2\eta_2}{\xi_2'^2}\right)\left(\frac{|A_4|}{|A_2|}\right)\left(\frac{|C_4|}{|C_2|}\right)\sin\varphi_{A_1C_1,4}\right]\end{array}\right\}+a_3+\ldots,$$

$$F_4(S) = 2|A_1||C_1|\times\left\{\begin{array}{l}\frac{P_1}{P_1'}\left[\left(\frac{\xi_1\eta_1}{\xi_1'^2}\right)\cos\varphi_{A_1C_1,1}+ \right. \\ \left(\frac{\xi_2\eta_2}{\xi_2'^2}\right)\left(\frac{|A_3|}{|A_1|}\right)\left(\frac{|C_3|}{|C_1|}\right)\cos\varphi_{A_1C_1,2}\right]- \\ \frac{P_2}{P_2'}\left[\left(\frac{\xi_1\eta_1}{\xi_1'^2}\right)\cos\varphi_{A_1C_1,3}+ \right. \\ \left.\left(\frac{\xi_2\eta_2}{\xi_2'^2}\right)\left(\frac{|A_3|}{|A_1|}\right)\left(\frac{|C_3|}{|C_1|}\right)\cos\varphi_{A_1C_1,4}\right]\end{array}\right\}+ \quad (54)$$

$$2|A_1||C_1|\left(\frac{|A_2|}{|A_1|}\right)\left(\frac{|C_2|}{|C_1|}\right)\times\left\{\begin{array}{l}\frac{P_1}{P_1'}\left[\left(\frac{\xi_1\eta_1}{\xi_1'^2}\right)\sin\varphi_{A_1C_1,1}+ \right. \\ \left(\frac{\xi_2\eta_2}{\xi_2'^2}\right)\left(\frac{|A_4|}{|A_2|}\right)\left(\frac{|C_4|}{|C_2|}\right)\sin\varphi_{A_1C_1,2}\right]+ \\ \frac{P_2}{P_2'}\left[\left(\frac{\xi_1\eta_1}{\xi_1'^2}\right)\sin\varphi_{A_1C_1,3}+ \right. \\ \left.\left(\frac{\xi_2\eta_2}{\xi_2'^2}\right)\left(\frac{|A_4|}{|A_2|}\right)\left(\frac{|C_4|}{|C_2|}\right)\sin\varphi_{A_1C_1,4}\right]\end{array}\right\}+a_4+\ldots.$$

where $$a_3 = \left(\frac{P_1}{P_1'} - \frac{P_2}{P_2'}\right)\left[(|A_1|^2+|A_2|^2)\left(\frac{\xi_1^2}{\xi_1'^2}\right) - (|A_3|^2+|A_4|^2)\left(\frac{\xi_2^2}{\xi_2'^2}\right)\right] + \quad (55)$$

$$\left(\frac{P_1}{P_1'} - \frac{P_2}{P_2'}\right)\left[(|B_1|^2+|B_2|^2)\left(\frac{\zeta_1^2}{\xi_1'^2}\right) - (|B_3|^2+|B_4|^2)\left(\frac{\zeta_2^2}{\xi_2'^2}\right)\right] +$$

$$\left(\frac{P_1}{P_1'} - \frac{P_2}{P_2'}\right)\left[(|C_1|^2+|C_2|^2)\left(\frac{\eta_1^2}{\xi_1'^2}\right) - (|C_3|^2+|C_4|^2)\left(\frac{\eta_2^2}{\xi_2'^2}\right)\right],$$

-continued $$a_4 = \left(\frac{P_1}{P_1'} + \frac{P_2}{P_2'}\right)\left[(|A_1|^2 + |A_2|^2)\left(\frac{\xi_1^2}{\xi_1'^2}\right) - (|A_3|^2 + |A_4|^2)\left(\frac{\xi_2^2}{\xi_2'^2}\right)\right] + \qquad (56)$$
$$\left(\frac{P_1}{P_1'} + \frac{P_2}{P_2'}\right)\left[(|B_1|^2 + |B_2|^2)\left(\frac{\xi_1^2}{\xi_1'^2}\right) - (|B_3|^2 + |B_4|^2)\left(\frac{\xi_2^2}{\xi_2'^2}\right)\right] +$$
$$\left(\frac{P_1}{P_1'} + \frac{P_2}{P_2'}\right)\left[(|C_1|^2 + |C_2|^2)\left(\frac{\eta_1^2}{\xi_1'^2}\right) - (|C_3|^2 + |C_4|^2)\left(\frac{\eta_2^2}{\xi_2'^2}\right)\right],$$

The parameters $$\left[\left(\frac{|A_2|}{|A_1|}\right)\left(\frac{|C_2|}{|C_1|}\right)\right], \qquad (57)$$

$$\left(\frac{|A_4|}{|A_2|}\right)\left(\frac{|C_4|}{|C_2|}\right), \qquad (58)$$

$$\left[\left(\frac{|A_3|}{|A_1|}\right)\left(\frac{|C_3|}{|C_1|}\right)\right], \qquad (59)$$

need to be determined in order to complete the determination of a conjugated quadratures for certain end use applications. The parameters given by Eqs. (57), (58), and (59) can for example be measured by procedures analogous to the procedure described for the bi-homodyne detection method with respect to measuring the quantity specified by Eq. (5).

The remaining description of the quad-homodyne detection method with respect to considerations not related to effects of vibrations and environmental changes is the same as the corresponding portion of the description given for the bi-homodyne detection method.

The appearance of effects of vibrations and environmental changes is determined by expressing $\phi_{A_1C_1,j} = \phi_{A_1C_1} + \Delta\phi_j$ in Eqs. (53) and (54) where $\Delta\phi$ comprises the effects of vibration, environmental changes, and tilts between reference object 62 and measurement object 60 and following the same procedures used with respect to the single- and bi-homodyne detection methods herein to determine the corresponding effects of vibrations and environmental changes. The results obtained for the quad-homodyne detection method exhibit properties that are substantially the same as the properties exhibited for the bi-homodyne detection method.

Different embodiments may use the quad-homodyne detection method instead of the bi-homodyne detection method used in other embodiments of the invention. For the other embodiments such as those that are based on the apparatus shown in FIG. 1a, the corresponding other embodiments use variants of the apparatus shown in FIG. 1a. In the variants of the apparatus such as used in the first embodiment, interferometer 10 is modified to include for example a CCD configured with an architecture that pairs each photosensitive pixel with a blanked-off storage pixel to which the integrated charge is shifted at the moment of an interline transfer or a dispersive element such as a direct vision prism or a dichroic beam-splitter. When configured with a dispersive element, a second detector is further added to the system.

Descriptions of the variants of the apparatus based on the incorporation of a dispersive element are the same as corresponding portions of descriptions given for corresponding systems in commonly owned U.S. patent application Ser. No. 10/765,229 (ZI-45) entitled "Interferometric Confocal Microscopy Incorporating Pinhole Array Beam-Splitter" by Henry A. Hill. The contents of the patent application are herein incorporated in their entirety by reference. Corresponding variants of the apparatus are also used for certain embodiments of the present invention that comprise interferometers such as linear displacement interferometers.

It is also evident that since the conjugated quadratures of fields are obtained jointly when using the quad-homodyne detection, there is a significant reduction in the potential for an error in tracking phase as a result of a phase redundancy unlike the situation possible in single-homodyne detection of conjugated quadratures of fields.

There are a number of advantages of the quad-homodyne detection as a consequence of the conjugated quadratures of fields being jointly acquired quantities.

One advantage of the quad-homodyne detection method in relation to the bi-homodyne detection method is a factor of two increase in throughput.

Another advantage is a reduced sensitivity to the effects of an overlay error of a spot in or on the substrate that is being imaged and a conjugate image of a pixel of a conjugate set of pixels of a multipixel detector during the acquisition of the four electrical interference signal values of each spot in and/or on a object imaged. Overlay errors are errors in the set of four conjugate images of a respective set of conjugate detector pixels relative to the spot being imaged.

Another advantage is that when operating in the scanning mode there is reduced sensitivity to effects of window to window variations of a respective conjugate set of windows of the input beam 24 to the interferometer system.

Another advantage is that when operating in the scanning mode there is an increase in throughput since only two windows of the source is required to generate the four electrical interference values.

Figure 1F:
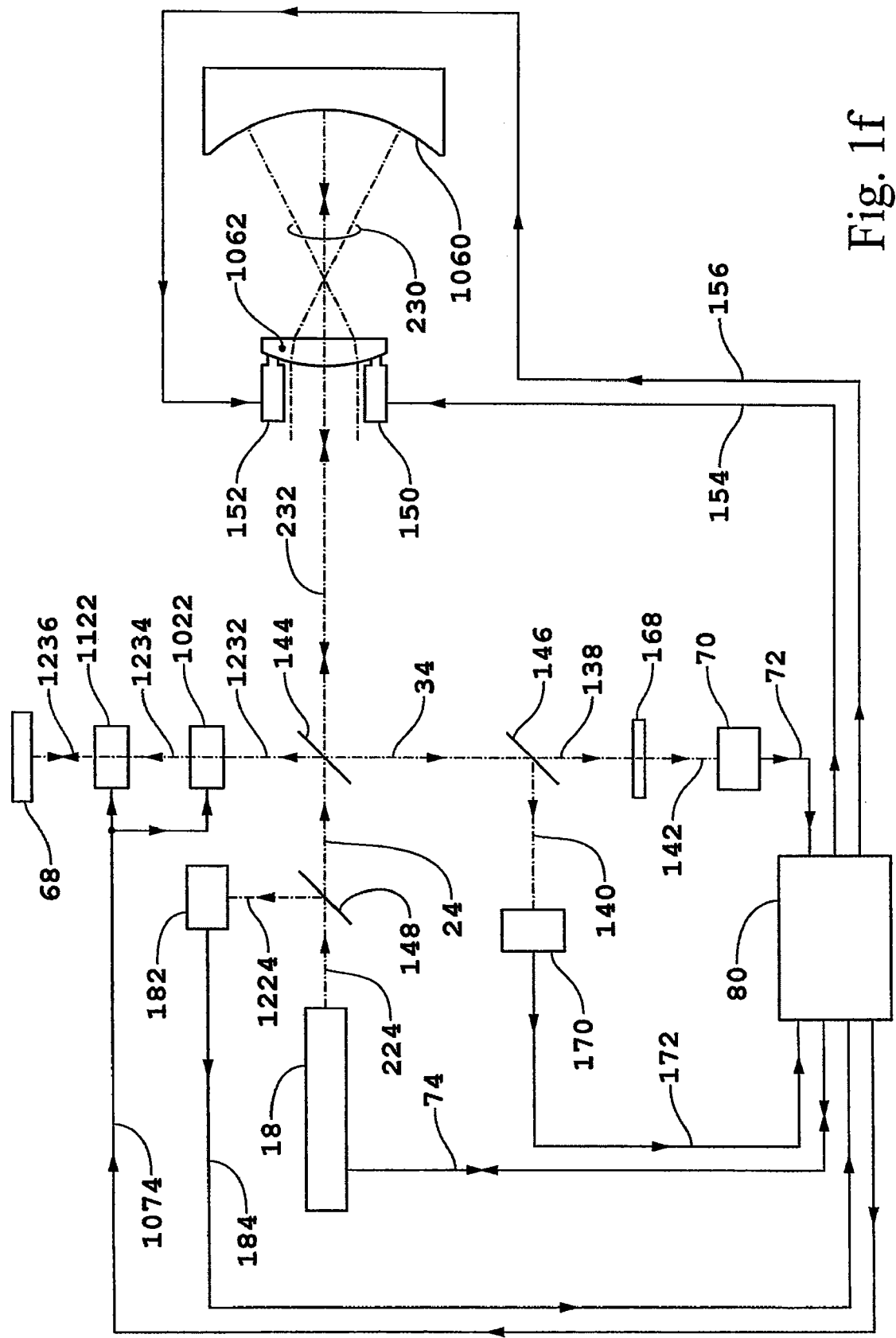
FIG. 1f is a schematic diagram of an interferometer system of the Twyman-Green type that uses homodyne detection methods configured to operate with modulation of the optical path length difference between the reference and measurement objects.

A second embodiment is shown schematically in FIG. 1f. The second embodiment comprises interferometer 10 configured as a Twyman-Green interferometer that uses homodyne detection methods based on a combination of polarization, temporal, and frequency encoding with or without use of phase shifting introduced by a relative translation of reference and measurement objects 62 and 1060 or by phase modulators 1022 and 1122. Phase modulators 1022 and 1122 are controlled by components of signal 1074 from electronic processor and controller 80. The second embodiment is in addition operated with a reference frame and a reference optical frequency $f_R$ wherein the relative optical path length between a spot on surface 64 and a corresponding spot on measurement object 1060 is maintained constant mod $2\pi$ at the reference optical frequency $f_R$. The homodyne detection methods exhibit an intrinsic reduced sensitivity to vibrations and environmental changes.

In FIG. 1f, source 18 generates input beam 224 with two orthogonally polarized components wherein each polarized component comprises a single frequency component that is switched between selected frequency values with a switching frequency that is preferably high compared to the frequencies of the effects of vibration and environmental changes that may be present. The description of source 18 is the same as the description of source 18 of the first embodiment of the present invention with the addition of EOMs and analyzers to rotate the polarization state of beam 224 between different frequency components.

With reference to FIG. 1f, interferometer 10 comprises polarizing beam-splitter 144, reference object 62 with reference surface 64; measurement object 1060; transducers 150 and 152; detectors 70, 170, and 182; and electronic processor and controller 80. Input beam 224 is incident on non-polarizing beam splitter 148 and a first portion thereof transmitted as beam 24 and a second portion thereof reflected as monitor beam 1224. Beam 24 is incident on polarizing beam-splitter 144 and a first portion thereof transmitted as a measurement beam component of beam 232 and a second portion thereof reflected as reference beam component of beam 1232. The first and second portions are polarized parallel and orthogonal to the plane of FIG. 1f, respectively. Measurement beam component of beam 232 is subsequently incident on lens 1062 and transmitted as a measurement component of beam 230. The measurement beam component of beam 230 is incident on measurement object 1060 and a portion thereof reflected as a reflected measurement beam component of beam 230. The reflecting surface of measurement object 1060 is shown as a curved surface in FIG. 1f. The reflected measurement beam component of beam 230 is incident on lens 1062 and transmitted as the collimated reflected measurement beam component of beam 232. The reflected measurement beam component of beam 232 is next incident on polarizing beam-splitter 144 and reflected as a measurement beam component of output beam 34.

Reference beam component of beam 1232 is transmitted by phase modulator 1022 as a reference beam component of beam 1234 which is transmitted by phase modulator 1122 as a reference beam component of beam 1236. The reference beam component of beam 1236 is reflected by reference object 68 as a reflected reference beam component of beam 1236. The reflected reference beam component of beam 1236 is transmitted by phase modulators 1122 and 1022 as reflected reference beam components of beams 1234 and 1232, respectively. The reflected reference beam component of beam 1232 is incident on and transmitted by polarizing beam-splitter 144 as a reference beam component of output beam 34

Continuing with the description of the second embodiment, output beam 34 is incident on non-polarizing beam-splitter 146 and first and second portions thereof transmitted and reflected, respectively, as beams 138 and 140, respectively. Beam 138 is detected by detector 70 preferably by a quantum process to generate electrical interference signal 72 after transmission by shutter 168 if required to generate beam 142 as a gated beam. Shutter 168 is controlled by electronic processor and controller 80. The function of shutter may be alternatively served by a shutter integrated into detector 70. Electrical interference signal 72 contains information about the difference in surface profiles of surfaces of reference object 68 and the reflecting surface of measurement object 1060.

Beam 140 is incident on and detected by detector 170 preferably by a quantum process to generate electrical interference signal 172. If beam 140 is not a mixed beam, it is passed through an analyzer in detector 170 to form a mixed beam prior to detection by detector 170. Detector 170 comprises one or more high speed detectors where each of the high speed detectors may comprise one or more pixels. The photosensitive areas of each of the one or more high speed detectors overlaps a portion of the wavefront of beam 140.

Electrical interference signal 172 contains information about the relative changes in the optical path lengths between the reference and measurement objects 68 and 1060 at positions corresponding to the portions of the wavefront of beam 140 incident on each of the high speed detectors. The information contained in electrical interference signal 172 is processed and used by electronic processor and controller 80 to establish and maintain the reference frame and to detect changes in relative orientation and/or deformation of the reference and measurement objects 68 and 1060. The description of electrical interference signal 172 and the subsequent processing by electronic processor and controller 80 is the same as the corresponding portion of the description of the first embodiment.

Beam 1224 is incident on detector 182 and detected preferably by a quantum process to generate electrical interference signal 184. Electrical interference signal 184 is processed and used by electronic processor and controller 80 to monitor and control the amplitude of components of beam 224 through a component of signal 74.

With reference to FIG. 1f, the phase shifting is achieved either with shifting the frequencies of components of input beam 24 or in conjunction with phase shifting introduced by translation and/or rotation of reference object 68 by transducers such as the transducers used to translate and/or rotate the reference object 62 of the first embodiment of the present invention or by phase modulators 1022 and 1122. Phase modulators 1022 and 1122 modulate the phases of orthogonally polarized components of transmitted beams as controlled by components of signal 1074 from electronic processor and controller 80. Transducers 150 and 152 which are controlled by signals 154 and 156, respectively, from electronic processor and controller 80 control the position and orientation of lens 1062. A third transducer located out of the plane of FIG. 1f (not shown in figure) is used to introduce changes in angular orientation of reference object 62 that are orthogonal to the changes in angular orientation introduced by transducers 150 and 152.

The remaining description of the second embodiment is the same as corresponding portions of the descriptions of the first embodiment of the present invention.

Figure 2:
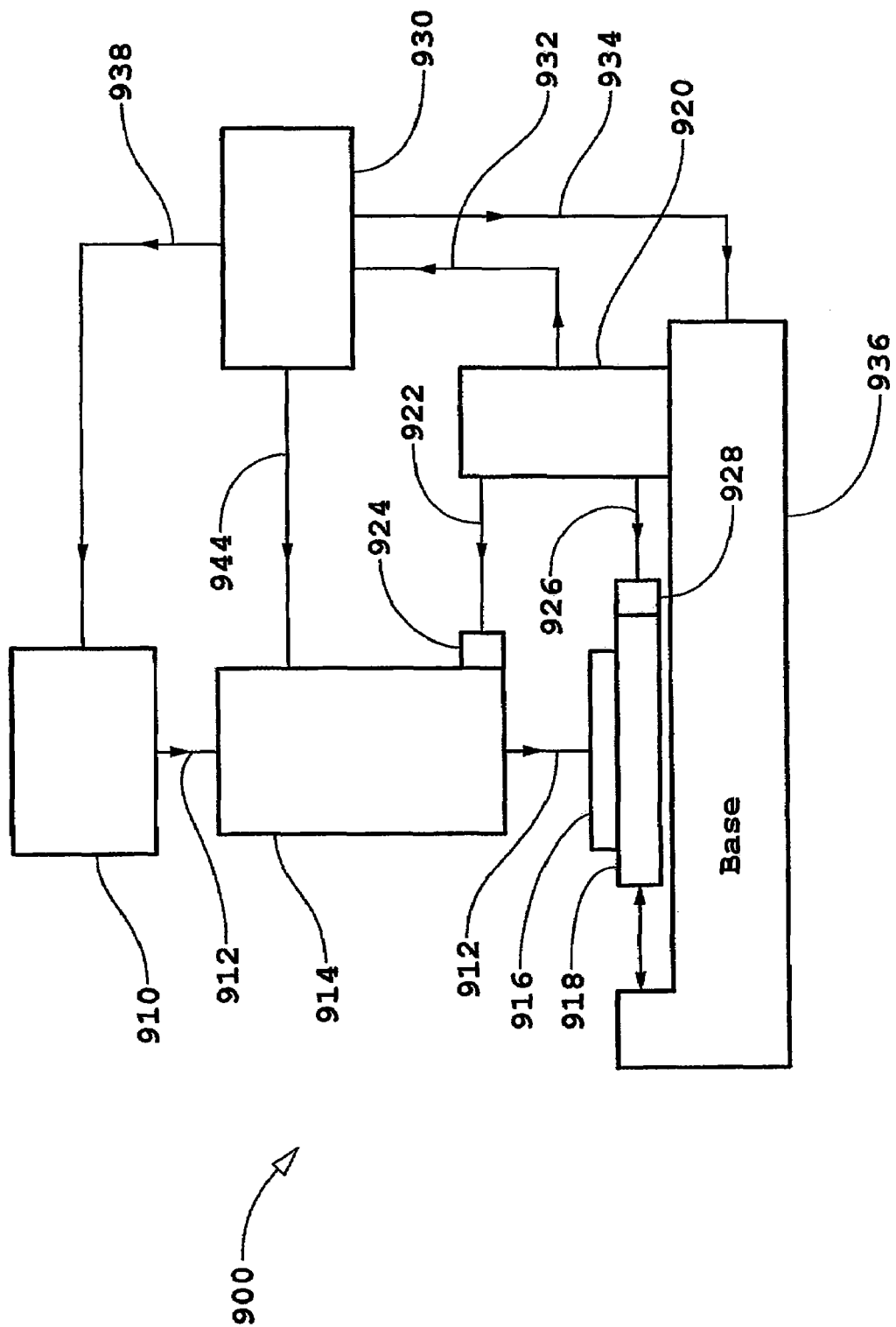
FIG. 2 is a diagram of an interferometric metrology system and scanning system for scanning a measurement object.

Two different modes are described for the acquisition of the electrical interference signals 72. The first mode to be described is a step and stare mode wherein objects 60 and 1060 of the first and second embodiments are stepped between fixed locations corresponding to locations where image information is desired. The second mode is a scanning mode. The descriptions of the two different modes are made with reference to FIG. 2 where a schematic of a metrology system 900 using a wavefront metrology system of the present invention is shown. A source 910 generates a source beam and a wavefront metrology system 914 such as described in the first and second embodiments of the present invention directs a measurement beam 912 to a measurement object 916 supported by a movable stage 918. Source 910 is the same as source 18 shown in FIG. 1a. Measurement beam 912 located between wavefront metrology system 914 and measurement object 916 corresponds to measurement beam components 30A and 30B as shown in FIG. 1a.

To determine the relative position of stage 918, an interferometry system 920 directs a reference beam 922 to a mirror 924 mounted on wavefront metrology system 914 and a measurement beam 926 to a mirror 928 mounted on stage 918. Changes in the position measured by interferometry system 920 correspond to changes in the relative position of measurement beam 912 on measurement object 916. Interferometry system 920 sends a measurement signal 932 to controller 930 that is indicative of the relative position of measurement beam 912 on measurement 916. Controller 930 sends an output signal 934 to a base 936 that supports and positions stage 918. Interferometer system 920 may comprise for example linear displacement and angular displacement interferometers and cap gauges.

Controller 930 can cause the wavefront metrology system 914 to scan the measurement beam 912 over a region of the measurement object 916, e.g., using signal 934. As a result, controller 930 directs the other components of the system to generate information about different regions of the measurement object.

In the step and stare mode for generating a one-dimensional, a two-dimensional or a three-dimensional profile of measurement object 916, controller 930 translates stage 918 to a desired position and then acquires a set of at least three arrays of electrical interference signal values. After the acquisition of the sequence of at least three arrays of electrical interference signals, controller 930 then repeats the procedure for the next desired position of stage 918. The elevation and angular orientation of measurement object 916 is controlled by base 936.

The second mode for the acquisition of the electrical interference signal values is next described wherein the electrical interference signal values are obtained with the position of stage 918 scanned in one or more directions. In the scanning mode, source 910 is pulsed at times controlled by signal 938 from controller 930. Source 910 is pulsed at times corresponding to the registration of the conjugate image of pixels of the detector corresponding for example to detector 70 of FIG. 1*b* with positions on and/or in measurement object 916 for which image information is desired.

There will be a restriction on the duration or "pulse width" of a beam pulse sequence $\tau_{p1}$ or corresponding integration time of the detector produced by source 910 as a result of the continuous scanning mode. Pulse width $\tau_{p1}$ will be a parameter that in part controls the limiting value for spatial resolution in the direction of a scan to a lower bound of $$\tau_{p1} v, \qquad (60)$$

where v is the scan speed. For example, with a value of $\tau_{p1}$=50 nsec and a scan speed of v=0.20 m/sec, the limiting value of the spatial resolution $\tau_{p1} v$ in the direction of scan will be $$\tau_{p1} v = 10 \text{ nm}. \qquad (61)$$

Pulse width $\tau_{p1}$ will also determine the minimum frequency difference that can be used in the bi-homodyne detection. In order that there be no contributions to the electrical interference signals from interference between fields of conjugated quadratures, the minimum frequency spacing $\Delta f_{min}$ is expressed as $$\Delta f_{min} \gg \frac{1}{\tau_{p1}}. \qquad (62)$$

For the example of $\tau_{p1}$=50 nsec, $1/\tau_{p1}$=20 MHz.

The frequencies of input beam 912 are controlled by signal 938 from controller 930 to correspond to the frequencies that will yield the desired phase shifts between the reference and return measurement beam components of output beams. In the first mode or step and stare mode for the acquisition of the electrical interference signal values, the set of at least three electrical interference signal values corresponding to a set of at least three electrical interference values are generated by common pixels of the detector. In the second or scanning mode for the acquisition of electrical interference signals, a set of at least three electrical interference signal values are not generated by a common pixel of the detector. Thus in the scanning mode of acquisition, the differences in pixel efficiency are compensated in the signal processing by controller 930 as described in the description of the bi- and quad-homodyne detection methods. The joint measurements of conjugated quadratures of fields are generated by controller 930 as previously described in the description of the bi- and quad-homodyne detection methods.

A third embodiment of the present invention comprises the interferometer system of FIG. 1*a* with interferometer 10 comprising an interferometric far-field confocal microscope such as described in referenced U.S. Pat. No. 5,760,901. In the third embodiment, the interferometer system is configured to use a multiple-homodyne detection method. Embodiments in U.S. Pat. No. 5,760,901 are configured to operate in either the reflection or transmission mode. The third embodiment has reduced effects of background because of background reduction features of U.S. Pat. No. 5,760,901.

A fourth embodiment of the present invention comprises the interferometer system of FIG. 1*a* with interferometer 10 comprising an interferometric far-field confocal microscope such as described in U.S. Pat. No. 6,480,285 B1. In the fifth embodiment, the interferometer system is configured to use a multiple-homodyne detection method. Embodiments in U.S. Pat. No. 6,480,285 B1 are configured to operate in either the reflection or transmission mode. The fourth embodiment has reduced effects of background because of background reduction features of U.S. Pat. No. 6,480,285 B1.

A fifth embodiment of the present invention comprises the interferometer system of FIG. 1*a* with interferometer 10 comprising an interferometric near-field confocal microscope such as described in U.S. Pat. No. 6,445,453. In the fifth embodiment, the interferometer system is configured to use a multiple-homodyne detection method. Embodiments in U.S. Pat. No. 6,445,453 are configured to operate in either the reflection or transmission mode. The fifth embodiment of U.S. Pat. No. 6,445,453 in particular is configured to operate in the transmission mode with the measurement beam separated from the reference beam and incident on the measurement object being imaged by a non-confocal imaging system. Accordingly, the fifth embodiment of the present invention represents an application of a multiple-homodyne detection method in a non-confocal configuration for the measurement beam.

Interferometer 10 may further comprise any type of interferometer, e.g., a differential plane mirror interferometer, a double-pass interferometer, a Michelson-type interferometer and/or a similar device such as is described in an article entitled "Differential Interferometer Arrangements For Distance And Angle Measurements: Principles, Advantages And Applications" by C. Zanoni, *VDI Berichte* Nr. 749, pp 93-106 (1989) configured for multiple-homodyne detection. Interferometer 10 may also comprise a passive zero shear plane mirror interferometer as described in U.S. Pat. No. 6,847,452 entitled "Passive Zero Shear Interferometers" or an interferometer with a dynamic beam steering element such as described in U.S. Pat. No. 6,552,804 B2 entitled "Apparatus And Method For Interferometric Measurements Of Angular Orientation And Distance To A Plane Mirror Object" and U.S. Pat. No. 6,271,923 entitled "Interferometry System Having A Dynamic Beam Steering Assembly For Measuring Angle And Distance," all of which are by Henry A. Hill. For embodiments of the present invention which comprise interferometric apparatus such as described in the U.S. patents and the article by Zanoni, the described interferometers are configured for a multiple-homodyne detection and the embodiments represent configurations that are of a non-confocal type.

Other embodiments are within the following claims.

What is claimed is:

1. A wavefront interferometry system comprising:
a source for generating a source beam;
a reference object which interacts with at least a portion of the source beam to produce a reference beam;

an optical system for deriving a measurement beam from the source beam and directing the measurement beam towards a measurement object to produce a return measurement beam that is combined with the reference beam to produce a combined beam;

a beam splitter for separating out first and second portions of the combined beam;

a first detector system for generating a first interference signal from the first portion of the combined beam;

a second detector system for generating a second interference signal from the second portion of the combined beam; and a processor system programmed to concurrently process both the first and second interference signals to generate from the first interference signal a control signal and from the second interference signal information about the difference in wavefront profiles of the reference and measurement objects, wherein the control signal controls a system parameter so as to maintain an optical path length difference between a spot on the reference object and a corresponding spot on the measurement object at a constant value mod $2\pi$.

2. The wavefront interferometer of claim 1, wherein the first detector samples a part of the first portion of the combined beam that corresponds to the spot on the measurement object.

3. The wavefront interferometer of claim 1, wherein the control signal controls the reference optical frequency of the source beam generated by the source so as to maintain the optical path length difference between a spot on the reference object and a corresponding spot on the measurement object at a constant value mod $2\pi$.

4. The wavefront interferometer of claim 1, further comprising a transducer that controls the physical position of the reference object and wherein the control signal controls the transducer so as to maintain the optical path length difference between a spot on the reference object and a corresponding spot on the measurement object at a constant value mod $2\pi$.

5. The wavefront interferometer of claim 1 configured to employ a multi-homodyne detection technique to determine the information about the difference in wavefront profiles of the reference and measurement objects.

6. The wavefront interferometer of claim 5, wherein the multi-homodyne detection technique is a bi-homodyne detection technique.

7. The wavefront interferometer of claim 5, wherein the multi-homodyne detection technique is a quad-homodyne detection technique.

8. The wavefront interferometer of claim 1, wherein the wavefront interferometer is a Fizeau interferometer.

9. The wavefront interferometer of claim 1, wherein the wavefront interferometer is a Twyman-Green interferometer.

10. The wavefront interferometer of claim 1, wherein the processor system is programmed to introduce a sequence of phase shifts between reference beam and the return measurement beam.

11. The wavefront interferometer of claim 10, wherein the sequence of phase shifts is selected so as to eliminate from conjugated quadratures derived from the combined beam any first order effects due to unwanted vibrations and/or environmental changes.

12. The wavefront interferometer of claim 1, wherein effects of unwanted vibrations and/or environmental changes appear as cyclic errors in conjugated quadratures derived from the combined beam and the processor system is programmed to measure and compensate for those cyclic errors.

13. The wavefront interferometer of claim 1, wherein the combined beam is an interference beam.

14. The wavefront interferometer of claim 1, wherein the second detector system comprises an array of detector elements which measures a corresponding array of locations on the measurement object.

15. A wavefront interferometry system comprising:

a wavefront interferometer that during operation combines a reference beam from a reference object and a measurement beam from a measurement object to generate a combined beam; and a processor system programmed to processes the combined beam to concurrently generate therefrom a control signal and information about the difference in wavefront profiles of the reference and measurement objects, wherein the control signal controls a system parameter so as to maintain an optical path length difference between a spot on the reference object and a corresponding spot on the measurement object at a constant value mod $2\pi$.

16. A method comprising:

combining a reference beam from a reference object with a return measurement beam from a measurement object to generate a combined beam;

processing the combined beam to concurrently generate therefrom a control signal and information about the difference in wavefront profiles of the reference and measurement objects; and using the control signal to maintain an optical path length difference between a spot on the reference object and a corresponding spot on the measurement object at a constant value mod $2\pi$.

17. The method of claim 16, further comprising:

generating a source beam;

interacting at least a portion of the source beam with the reference object to produce the reference beam;

deriving the measurement beam from the source beam; and interacting the measurement beam with the measurement object to produce the return measurement beam.

18. The method of claim 17, wherein processing the combined beam comprises using a single-homodyne detection method to process one portion of the combined beam to generate the control signal.

19. The method of claim 17, wherein processing the combined beam comprises using a multiple-homodyne detection method to process one portion of the combined beam to generate said information about the difference in wavefront profiles of the reference and measurement objects.

20. The method of claim 17, further comprising introducing a sequence of phase shifts between reference beam and the return measurement beam.

21. The method of claim 17, wherein the sequence of phase shifts is selected so as to eliminate from conjugated quadratures derived from the combined beam any first order effects due to unwanted vibrations and/or environmental changes.

22. The method of claim 17, wherein effects of unwanted vibrations and/or environmental changes appear as cyclic errors in conjugated quadratures derived from the combined beam and said method further comprising measuring and compensating for those cyclic errors.

* * * * *